US012775551B2

(12) United States Patent
Wang et al.

(10) Patent No.: US 12,775,551 B2
(45) Date of Patent: Oct. 27, 2026

(54) MEMORY SYSTEMS AND OPERATION METHODS, SYSTEMS, AND STORAGE MEDIUMS THEREOF

(71) Applicant: YANGTZE MEMORY TECHNOLOGIES CO., LTD., Wuhan (CN)

(72) Inventors: Yuetan Wang, Wuhan (CN); Yue Ma, Wuhan (CN); Kaiyao Cao, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 19/013,931

(22) Filed: Jan. 8, 2025

(65) Prior Publication Data

US 2026/0044446 A1 Feb. 12, 2026

Related U.S. Application Data

(63) Continuation of application No. PCT/CN2024/110089, filed on Aug. 6, 2024.

(51) Int. Cl.
*G06F 12/02* (2006.01)

(52) U.S. Cl.
CPC .. *G06F 12/0246* (2013.01); *G06F 2212/7204* (2013.01)

(58) Field of Classification Search
CPC ..................... G06F 12/0246; G06F 2212/7204
See application file for complete search history.

(56) References Cited

U.S. PATENT DOCUMENTS 11,625,178 B2 * 4/2023 Byun ...................... G06F 3/064 711/154
2020/0104056 A1 * 4/2020 Benisty ................. G06F 3/0688
(Continued)

FOREIGN PATENT DOCUMENTS

| | | |
|---|---|---|
| CN | 111078582 A | 4/2020 |
| CN | 112306900 A | 2/2021 |
| CN | 112309450 A | 2/2021 |

OTHER PUBLICATIONS

Yangtze Memory Technologies Co., Ltd., "International Search Report," mailed Apr. 22, 2025, PCT App No. PCT/CN2024/110089, 7 p.

(Continued)

*Primary Examiner* — Kalpit Parikh
(74) *Attorney, Agent, or Firm* — Conley Rose, P.C.

(57) ABSTRACT

Examples of the present disclosure provide memory systems and operation methods, systems, and storage mediums thereof. An example memory system includes a memory and a memory controller coupled with the memory. The memory controller is configured to control the memory to store in zones by zones, wherein a memory space of a single zone is configured to support sequential write; wherein the memory controller is configured with a first interface coupled with a host and to receive a first command from the host through the first interface; the first command includes an identifier of a specified zone and mode switching information of the specified zone; and the memory controller is further configured to switch a memory mode of the specified zone to a target memory mode indicated in the mode switching information according to the mode switching information.

20 Claims, 17 Drawing Sheets

(56) References Cited

U.S. PATENT DOCUMENTS

| | | | | |
|---|---|---|---|---|
| 2020/0341870 | A1* | 10/2020 | Frolikov | G06F 3/0679 |
| 2022/0050630 | A1 | 2/2022 | Bert | |
| 2023/0129727 | A1* | 4/2023 | Kim | G06F 3/0644<br>711/154 |
| 2023/0153032 | A1 | 5/2023 | Shin et al. | |
| 2023/0266897 | A1* | 8/2023 | Bert | G06F 3/061<br>711/154 |
| 2023/0266963 | A1 | 8/2023 | Han | |
| 2023/0297247 | A1 | 9/2023 | Kanno et al. | |
| 2024/0143211 | A1 | 5/2024 | Na et al. | |

OTHER PUBLICATIONS

Yangtze Memory Technologies Co., Ltd., “Search Report,” dated Jun. 23, 2026, European Patent App. No. 24927657.7-1218, 11 p.

* cited by examiner

300

| Byte \ Bit | 7 | 6 | 5 | 4 | 3 | 2 | 1 | 0 |
|---|---|---|---|---|---|---|---|---|
| 0 | OPERATION CODE(94h) | | | | | | | |
| 1 | Reserved | | | SERVICE ACTION( 04h) | | | | |
| 2 | (MSB) | | | | | | | |
| ... | ZONE ID | | | | | | | |
| 9 | | | | | | | | (LSB) |
| 10 | | | | | | | | |
| ... | Reserved | | | | | | | |
| 13 | | | | | | | | |
| 14 | Reserved | | | | | ZONE MODE | | ALL |
| 15 | CONTROL=00h | | | | | | | |

| Byte \ Bit | 7 | 6 | 5 | 4 | 3 | 2 | 1 | 0 |
|---|---|---|---|---|---|---|---|---|
| 0 | OPERATION CODE(95h) | | | | | | | |
| 1 | MODE RETURN | | | SERVICE ACTION( 00h) | | | | |
| 2 | (MSB) | ZONE START LBA | | | | | | |
| ... | | | | | | | | |
| 9 | | | | | | | | (LSB) |
| 10 | (MSB) | ALLOCATION LENGTH | | | | | | |
| ... | | | | | | | | |
| 13 | | | | | | | | (LSB) |
| 14 | partial | Reserved | REPORTING OPTIONS | | | | | |
| 15 | CONTROL=00h | | | | | | | |

FIG. 7

| Byte \ Bit | 7 | 6 | 5 | 4 | 3 | 2 | 1 | 0 |
|---|---|---|---|---|---|---|---|---|
| 0 | (MSB) | | | | | | | |
| ... | ZONE LIST LENGTH | | | | | | | |
| 3 | | | | | | | | (LSB) |
| 4 | Reserved | | | SAME=1h | | | | |
| 5 | | | | | | | | |
| ... | Reserved | | | | | | | |
| 7 | | | | | | | | |
| 8 | (MSB) | | | | | | | |
| ... | MAXIMUM LBA | | | | | | | |
| 15 | | | | | | | | (LSB) |
| 16 | | | | | | | | |
| ... | Reserved | | | | | | | |
| 63 | | | | | | | | |
| Zone descriptor list | | | | | | | | |
| 64 | (MSB) | | | | | | | |
| ... | Zone descriptor [first] | | | | | | | |
| 127 | | | | | | | | (LSB) |
| n-63 | (MSB) | | | | | | | |
| ... | Zone descriptor [last] | | | | | | | |
| n | | | | | | | | (LSB) |

FIG. 8A

| Byte \ Bit | 7 | 6 | 5 | 4 | 3 | 2 | 1 | 0 |
|---|---|---|---|---|---|---|---|---|
| 0 | Reserved | | | ZONE TYPE=02h | | | | |
| 1 | ZONE CONDITION | | | NAND MODE | | | | |
| 2 | (MSB) | | | | | | | |
| ... | | | | Reserved | | | | |
| 7 | | | | | | | | (LSB) |
| 8 | (MSB) | | | | | | | |
| ... | | | | ZONE LENGTH | | | | |
| 15 | | | | | | | | (LSB) |
| 16 | (MSB) | | | | | | | |
| ... | | | | ZONE START LBA | | | | |
| 23 | | | | | | | | (LSB) |
| 24 | (MSB) | | | | | | | |
| ... | | | | WRITE POINT LBA | | | | |
| 31 | | | | | | | | (LSB) |
| 32 | (MSB) | | | | | | | |
| ... | | | | Reserved | | | | |
| 63 | | | | | | | | (LSB) |

FIG. 8B

```
struct SLC_NAND {
  u32 ZONE_ID;
  u32 ZONE_CONDITION; /*1h:EMPTY
2h:OPEN   Eh:FULL*/
  struct SLC_NAND *next;
};
struct f2fs_SLC_ZONE_info {
  u32 slc_zone_count;
  struct SLC_NAND slc_nand_zone;
  u32 current_slc_zone_id;
};
```

FIG. 12

MEMORY SYSTEMS AND OPERATION METHODS, SYSTEMS, AND STORAGE MEDIUMS THEREOF

CROSS-REFERENCE TO RELATED APPLICATIONS

This application is a continuation of International Patent Application No. PCT/CN2024/110089, filed on Aug. 6, 2024, which is incorporated herein by reference in its entirety.

TECHNICAL FIELD

Examples of the present disclosure relate to the field of semiconductor technology, and in particular, to a memory system and an operation method, a system, and a storage medium thereof.

BACKGROUND

A memory and a system thereof are memory apparatuses configured to save information in the modern information technology. With the increasingly high requirements for the memory apparatuses, there may still be much room for improvements in the memory and the system thereof.

SUMMARY

Examples of the present disclosure provide a memory system and an operation method, a system, and a storage medium thereof.

In a first aspect, examples of the present disclosure provide a memory system, comprising a memory and a memory controller coupled with the memory. The memory controller is configured to control the memory to store in zones by zones, wherein a memory space of a single zone is configured to support sequential write; wherein the memory controller is configured with a first interface coupled with a host and to receive a first command from the host through the first interface; the first command comprises an identifier of a specified zone and mode switching information of the specified zone; and the memory controller is further configured to switch a memory mode of the specified zone to a target memory mode indicated in the mode switching information according to the mode switching information.

In some examples, the memory controller is configured to determine a current memory mode of the specified zone, and switch the current memory mode to the target memory mode according to the mode switching information in a case where the current memory mode is different from the target memory mode indicated in the mode switching information.

In some examples, the memory modes comprise a first memory mode and a second memory mode; when the zones are in the first memory mode, each of memory cells corresponding to the memory spaces of the zones is capable to be written N-bit data; when the zones are in the second memory mode, each of the memory cells corresponding to the memory spaces of the zones is capable to be written M-bit data; M and N are integers greater than or equal to 1; and M is greater than N.

In some examples, the memory controller is configured to: determine the specified zone according to the identifier of the specified zone; and switch the specified zone from the first memory mode to the second memory mode according to the mode switching information; or switch the specified zone from the second memory mode to the first memory mode according to the mode switching information.

In some examples, the memory controller is further configured to: receive a zone write request and write data through the first interface, wherein if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and write the write data to the memory space of the corresponding zone according to the zone write request.

In some examples, the memory controller is configured to reset a state of the specified zone to an empty state according to the first command.

In some examples, the first command comprises a reset write pointer command; and the mode switching information occupies a two-bit field in the reset write pointer command.

In some examples, the zones are zones in a zone name space (ZNS).

In some examples, the memory controller is further configured to: receive a second command through the first interface, wherein the second command comprises mode reply information for indicating whether memory mode information needs to be returned; and generate report zone parameter data satisfying the indication of the mode reply information according to the second command.

In some examples, the memory controller is configured to: where the mode reply information is configured to indicate that the memory mode information needs to be returned, generate the report zone parameter data comprising the memory mode information according to the second command.

In some examples, the memory mode information is in a zone descriptor in the report zone parameter data.

In some examples, the memory mode information occupies a four-bit field in the zone descriptor.

In some examples, the report zone parameter data comprises a zone descriptor list and a public descriptor; the zone descriptor list comprises at least one zone descriptor for indicating an own attribute of a corresponding zone; and the public descriptor is configured to indicate a public attribute of a plurality of the zones.

In some examples, the zone descriptor further comprises a zone type field, a zone state field, a zone length field, a zone start logical block address field, and a write pointer logical block address field.

In some examples, the public descriptor comprises a zone list length field, a same field, and a maximum logical block address field, etc.

In some examples, the second command comprises a report zone command.

In some examples, examples of the present disclosure provide a system, comprising a memory system and a host. The memory system comprises a memory and a memory controller coupled with the memory. The memory controller is configured to control the memory to store in zones by zones, wherein a memory space of a single zone is configured to support sequential write; wherein the memory controller is configured with a first interface coupled with the host and to receive a first command from the host through the first interface. The first command comprises an identifier of a specified zone and mode switching information of the specified zone; the host comprises a host controller and a second interface coupled with the memory controller. The host controller is configured to generate the first command and send the first command to the memory controller through the second interface.

In some examples, the memory controller is further configured to switch a memory mode of the specified zone to a target memory mode indicated in the mode switching information according to the mode switching information.

In some examples, the memory controller is configured to determine a current memory mode of the specified zone, and switch the current memory mode to the target memory mode according to the mode switching information in a case where the current memory mode is different from the target memory mode indicated in the mode switching information.

In some examples, the memory modes comprise a first memory mode and a second memory mode; when the zones are in the first memory mode, each of memory cells corresponding to the memory spaces of the zones is capable to be written n-bit data; when the zones are in the second memory mode, each of the memory cells corresponding to the memory spaces of the zones is capable to be written M-bit data; M and N are integers greater than or equal to 1; and M is greater than N.

In some examples, the memory controller is configured to: determine the specified zone according to the identifier of the specified zone; and switch the specified zone from the first memory mode to the second memory mode according to the mode switching information; or switch the specified zone from the second memory mode to the first memory mode according to the mode switching information.

In some examples, the host is configured with a file system. The host controller is configured to determine cold or hot attributes of write data by the file system, generate corresponding zone write requests according to the cold or hot attributes of the write data and send the write data and the zone write requests to the memory controller through the second interface; if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and the memory controller is configured to write the write data to the memory spaces of the corresponding zones according to the zone write requests.

In some examples, the host controller is configured to send a second command to the memory controller through the second interface. The second command comprises mode reply information for indicating whether the memory mode information needs to be returned. The memory controller is configured to receive the second command through the first interface, and generate report zone parameter data satisfying the indication of the mode reply information according to the second command and send the report zone parameter data to the host controller.

In some examples, the memory controller is configured to: where the mode reply information is configured to indicate that the memory mode information needs to be returned, generate the report zone parameter data comprising the memory mode information according to the second command and send the report zone parameter data to the host controller.

In some examples, the memory mode information is in a zone descriptor in the report zone parameter data.

In some examples, the report zone parameter data comprises a zone descriptor list and a public descriptor; the zone descriptor list comprises at least one zone descriptor for indicating an own attribute of a corresponding zone; and the public descriptor is configured to indicate a public attribute of a plurality of the zones.

In some examples, the zone descriptor further comprises a zone type field, a zone state field, a zone length field, a zone start logical block address field, and a write pointer logical block address field.

In some examples, the public descriptor comprises a zone list length field, a SAME field, and a maximum logical block address field, etc.

In some examples, the host is configured with a file system; and a host processor is configured to: establish a target zone data structure through the file system, wherein the target zone data structure is configured to store information of a target zone, and the target zone is a zone in the memory mode being the first memory mode; obtain the information of the target zone according to the report zone parameter data comprising the memory mode information; and store the information of the target zone to the target zone data structure.

In some examples, the target zone data structure is configured to store the number of the target zones, a target zone chain table list and an identifier of the currently used target zone, wherein a zone chain table list comprises at least one zone chain table, and a target zone chain table comprises the identifier of the target zone, a state of the target zone, and a chain table pointer of next target zone chain table.

In some examples, the host processor is configured to: in a preset scenario, send the first command to the memory controller through the second interface, wherein the preset scenario comprises at least one of: an initialization period of the file system, a case where the information of the target zone is not acquired according to the second command, and a case where the state of the currently used target zone in the target zone data structure is a full state.

In some examples, the host processor is configured to: acquire a residual space of the memory in the case where the state of the currently used target zone in the target zone data structure is determined to be the full state; and send the first command to the memory controller according to a maximum continuous space in the residual space meeting a preset condition.

In some examples, the information of the target zone comprises the identifier of the target zone, the state of the target zone, and the identifier of the currently used target zone.

In some examples, the file system comprises a flash friendly file system (F2FS).

In some examples, the first command comprises a reset write pointer command; and the mode switching information occupies a two-bit field in the reset write pointer command.

In some examples, the memory controller is configured to reset a state of the specified zone to an empty state according to the first command.

In some examples, the second command comprises a report zone command.

In some examples, the memory mode information occupies a four-bit field in the zone descriptor.

In some examples, the zones are zones in a zone name space (ZNS).

In a third aspect, examples of the present disclosure provide an operation method of a memory system. The memory system comprises a memory and a memory controller coupled with the memory. The memory controller is configured with a first interface coupled with a host. The method comprises: receiving a first command through the first interface, wherein the first command comprises an identifier of a specified zone and mode switching information of the specified zone; zones correspond to memory spaces of the memory; and the memory space of a single zone is configured to support sequential write; and switching, by the memory controller, a memory mode of the specified zone to a target memory mode indicated in the mode switching information according to the mode switching information.

In some examples, switching the memory mode of the specified zone to the target memory mode indicated in the mode switching information according to the mode switching information comprises: determining a current memory mode of the specified zone, and switching the current memory mode to the target memory mode according to the mode switching information in a case where the current memory mode is different from the target memory mode indicated in the mode switching information.

In some examples, the memory modes comprise a first memory mode and a second memory mode; when the zones are in the first memory mode, each of memory cells corresponding to the memory spaces of the zones is capable to be written N-bit data; when the zones are in the second memory mode, each of the memory cells corresponding to the memory spaces of the zones is capable to be written M-bit data; M and N are integers greater than or equal to 1; and M is greater than N.

In some examples, switching the memory mode of the specified zone to the target memory mode indicated in the mode switching information according to the mode switching information comprises: determining the specified zone according to the identifier of the specified zone; and switching the specified zone from the first memory mode to the second memory mode according to the mode switching information; or switching the specified zone from the second memory mode to the first memory mode according to the mode switching information.

In some examples, the method further comprises: receiving a zone write request and write data through the first interface, wherein if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and writing the write data to the memory space of the corresponding zone according to the zone write request.

In some examples, the method further comprises: receiving a second command through the first interface, wherein the second command comprises mode reply information for indicating whether memory mode information needs to be returned; and generating report zone parameter data satisfying the indication of the mode reply information according to the second command.

In some examples, where the mode reply information is configured to indicate that the memory mode information needs to be returned, generating the report zone parameter data satisfying the indication of the mode reply information according to the second command comprises: generating the report zone parameter data comprising the memory mode information according to the second command.

In some examples, the memory mode information is in a zone descriptor in the report zone parameter data.

In some examples, the memory mode information occupies a four-bit field in the zone descriptor.

In some examples, the report zone parameter data comprises a zone descriptor list and a public descriptor; the zone descriptor list comprises at least one zone descriptor for indicating an own attribute of a corresponding zone; and the public descriptor is configured to indicate a public attribute of a plurality of the zones.

In some examples, the zone descriptor further comprises a zone type field, a zone state field, a zone length field, a zone start logical block address field, and a write pointer logical block address field.

In some examples, the public descriptor comprises a zone list length field, a same field, and a maximum logical block address field, etc.

In some examples, the first command comprises a reset write pointer command; and the mode switching information occupies a two-bit field in the reset write pointer command.

In some examples, the second command comprises a report zone command.

In some examples, the zones are zones in a zone name space (ZNS).

In some examples, the method further comprises: resetting a state of the specified zone to an empty state according to the first command.

In a fourth aspect, examples of the present disclosure provide a computer readable storage medium, storing a computer program which, when executed, implements the method of the third aspect.

BRIEF DESCRIPTION OF THE DRAWINGS

In the drawings, unless stated otherwise, same reference signs throughout a plurality of drawings represent same or similar parts or elements. These drawings are not necessarily drawn to scale. It is to be understood that, these drawings merely describe some implementations disclosed according to the present disclosure, and should not be considered as limiting the scope of the present disclosure.

FIG. 7 is a schematic structural diagram of a report zone command of ZBCs provided by an example of the present disclosure.

FIG. 8A is a schematic structural diagram of report zone parameter data in ZBCs provided by an example of the present disclosure.

FIG. 8B is a schematic structural diagram of a zone descriptor in report zone parameter data provided by an example of the present disclosure.

FIG. 12 is diagram illustrating a target zone data structure provided by an example of the present disclosure.

DETAILED DESCRIPTION

Figure 1:
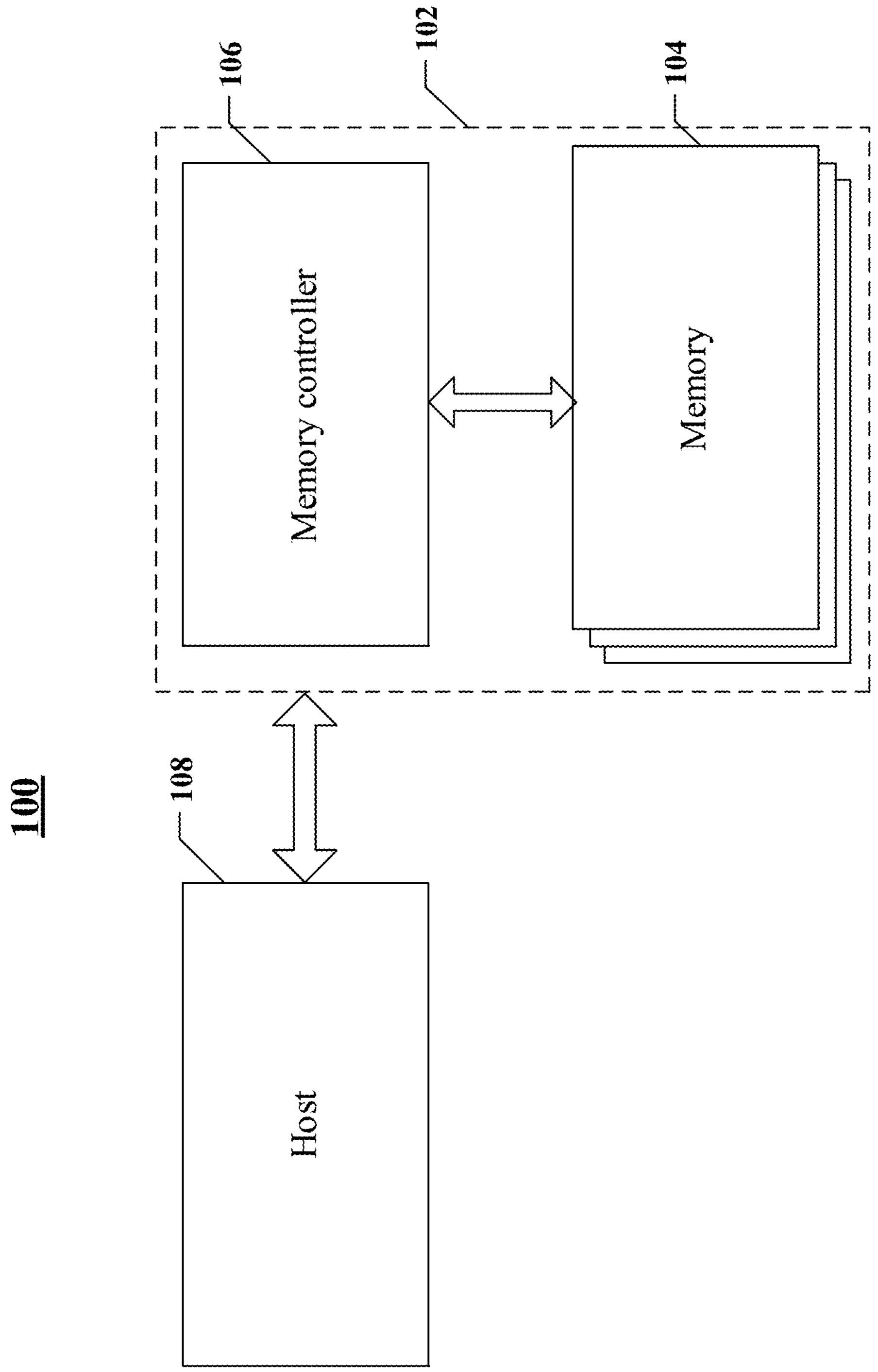
FIG. 1 is a schematic diagram of an example system having a memory system according to an example of the present disclosure.

Example implementations disclosed in the present disclosure will be described below in more details with reference to the drawings. Although the example implementations of the present disclosure are shown in the drawings, it is to be understood that the present disclosure may be implemented in various forms and should not be limited by the specific implementations set forth herein. Rather, these implementations are provided for a more thorough understanding of the present disclosure, and to fully convey a scope disclosed by the present disclosure to those skilled in the art.

In the following description, numerous specific details are given in order to provide the more thorough understanding of the present disclosure. However, it is apparent to those skilled in the art that the present disclosure may be practiced without one or more of these details. In other examples, in order to avoid confusion with the present disclosure, some technical features well-known in the field are not described. For example, all the features of the actual implementations are not described here, and well-known functions and structures are not described in detail.

In the drawings, the sizes of a layer, an area, and an element and their relative sizes may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It is to be understood that, although the terms first, second, third, etc. may be configured to describe various elements, components, areas, layers, and/or portions, these elements, components, areas, layers, and/or portions should not be limited by these terms. These terms are only configured to distinguish one element, component, area, layer or portion from another element, component, area, layer or portion. Thus, a first element, component, area, layer or portion discussed below may be denoted as a second element, component, area, layer or portion, without departing from the teachings of the present disclosure. When the second element, component, area, layer or portion is discussed, it does not mean that the first element, component, area, layer or portion is necessarily present in the present disclosure.

The spatially relative terms, such as "beneath", "below", "lower", "under", "over", "upper", and the like, may be used herein for ease of description to describe one element or feature's relationship to other elements or features as illustrated in the figures. In addition to orientations shown in the drawings, the spatial relationship terms are intended to further include the different orientations of a device in use and operation. For example, if the device in the drawings is turned over, then the elements or the features described as "below" or "under" or "beneath" other elements may be oriented "on" the other elements or features. Therefore, the example terms "below" and "beneath" may comprise both upper and lower orientations. The device may be orientated otherwise (rotated by 90 degrees or in other orientations), and the spatially descriptive terms used herein are interpreted accordingly.

The terms used herein are only intended to describe the specific examples, and are not used as limitations of the present disclosure. As used herein, unless otherwise indicated expressly in the context, "a", "an" and "the" in a singular form are also intended to comprise a plural form. It should also be understood that terms "consist of" and/or "comprise", when used in this specification, determine the presence of the described features, integers, steps, operations, elements and/or components, but do not preclude the presence or addition of one or more of other features, integers, steps, operations, elements, components, and/or groups. As used herein, the term "and/of" comprises any and all combinations of related items listed. The article used before "transmission line" represents the same meaning.

In order to be capable of understanding the characteristics and the technical contents of the examples of the present disclosure in more detail, implementation of the examples of the present disclosure is set forth in detail below in conjunction with the drawings, and the appended drawings are only used for reference and illustration, instead of being configured to limit the examples of the present disclosure.

A memory in examples of the present disclosure includes, but is not limited to, a three-dimensional NAND memory. For ease of understanding, the three-dimensional NAND memory is used as an example for description.

FIG. 1 is a block diagram of an example system 100 having a memory according to an example of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. As shown in FIG. 1, the system 100 may comprise a host 108 and a memory system 102, where the memory system 102 has one or more memories 104 and a memory controller 106. The host 108 may be a processor (e.g., a central processing unit (CPU)) or a system on chip (SOC) (e.g., an application processor (AP)) of an electronic apparatus. The host 108 may be configured to send or receive data to or from the memory 104. The host 108 comprises a host controller and a second interface coupled with the memory controller 106. For example, the second interface may also be an interface for the host to communicate with the memory controller.

In some implementations, the memory controller 106 is coupled to the memory 104 and the host 108, and is configured to control the memory 104. The memory controller 106 may manage data stored in the memory 104, and communicate with the host 108. In some implementations, the memory controller 106 is designed for operating in a low duty-cycle environment, such as secure digital (SD) cards, compact flash (CF) cards, universal serial bus (USB) flash drives, or other media for use in electronic apparatuses, such as personal computers, digital cameras, mobile phones, etc. In some implementations, the memory controller 106 is designed for operating in a high duty-cycle environment of SSDs or embedded multimedia cards (eMMCs) used as data memories for mobile apparatuses, such as smartphones, tablets, laptop computers, etc., and enterprise memory arrays.

The memory controller 106 may be configured to control operations of the memory 104, such as read, erase, and program operations. The memory controller 106 may further be configured to manage various functions with respect to data stored or to be stored in the memory 104, including, but not limited to, bad-block management, garbage collection, logical-to-physical address translation, wear leveling, etc. In some implementations, the memory controller 106 is further configured to process error correction codes (ECCs) with respect to data read from or written to the memory 104. The memory controller 106 may further perform any other suitable functions, for example, formatting the memory 104. The memory controller 106 may communicate with an external apparatus (e.g., the host 108) according to a specific communication protocol. For example, the memory controller 106 may communicate with the external apparatus through at least one of various interface protocols, such as a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, and a Firewire protocol, etc. These interfaces may also be referred as first interfaces (also called front end interfaces). Here, the first interfaces are interfaces coupled with the second interface of the host described above. In some examples, the memory controller 106 exchanges commands/data with the memory 104 through a plurality of channels configured. These channels are also referred to as back end interfaces.

Figure 2B:
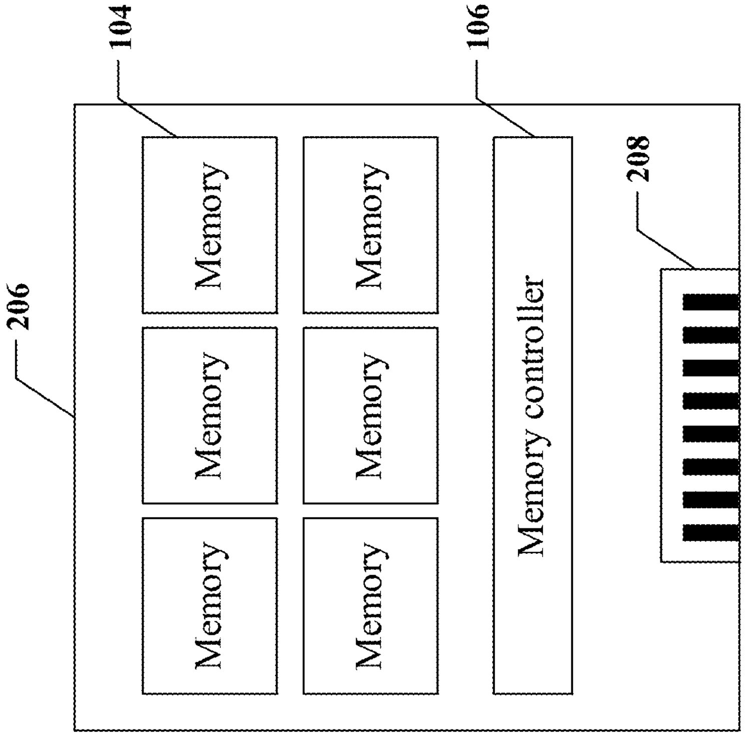
FIG. 2B is a schematic diagram of an example solid state drive having a memory system according to an example of the present disclosure.
Figure 2A:
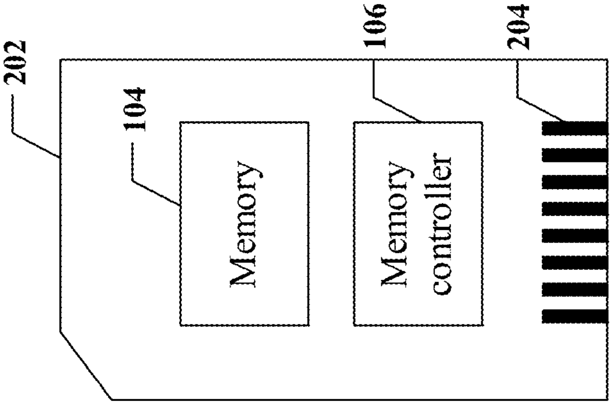
FIG. 2A is a schematic diagram of an example memory card having a memory system according to an example of the present disclosure.

The memory controller 106 and the one or more memories 104 may be integrated into various types of storage apparatuses, for example, be comprised in the same package (such as a universal flash storage (UFS) package or an eMMC package). For example, the memory system 102 may be implemented and packaged into different types of end electronic products. In one example shown in FIG. 2A, the memory controller 106 and the single memory 104 may be integrated into a memory card 202. The memory card 202 may include a PC card (Personal Computer Memory Card International Association (PCMCIA)), a CF card, a Smart Media (SM) card, a memory stick, a multimedia card (MMC, RS-MMC, MMCmicro), an SD card (SD, miniSD, microSD, SDHC), and a UFS, etc. The memory card 202 may further comprise a memory card connector 204 coupling the memory card 202 with a host (e.g., the host 108 in FIG. 1). In another example shown in FIG. 2B, the memory controller 106 and the plurality of memories 104 may be integrated into an SSD 206. The SSD 206 may further comprise an SSD connector 208 coupling the SSD 206 with a host (e.g., the host 108 in FIG. 1). In some implementations, at least one of a storage capacity or an operation speed of the SSD 206 is greater than at least one of a storage capacity or an operation speed of the memory card 202.

Figure 3A:
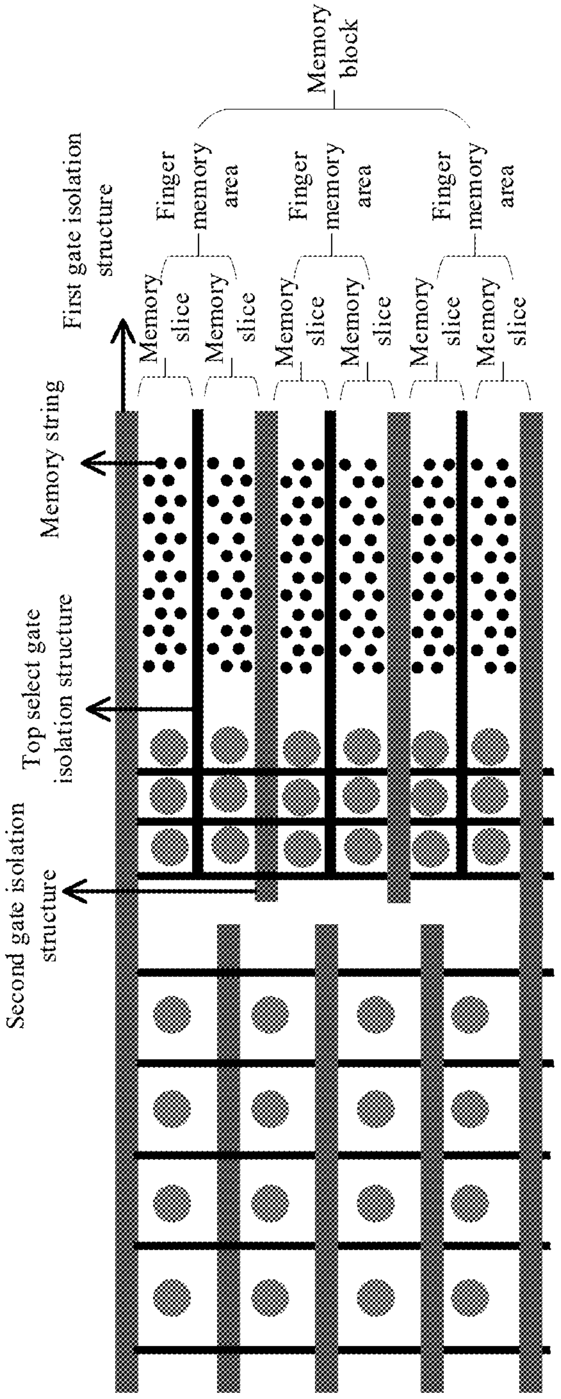
FIG. 3A is a schematic diagram of a memory cell distribution of a three-dimensional NAND memory according to an example of the present disclosure.

FIG. 3A is a schematic structural diagram of a memory cell array of a three-dimensional NAND memory according to an example of the present disclosure. As shown in FIG. 3A, the memory cell array of the three-dimensional NAND memory is composed of several rows of memory cell that are staggered in parallel and parallel to a gate isolation structure. Every two rows of memory cell are spaced apart by the gate isolation structure and a top select gate isolation structure, and each memory cell row comprises a plurality of memory cell strings. The gate isolation structure may comprise a first gate isolation structure and a second gate isolation structure. The first gate isolation structure divides the memory cell array into a plurality of memory blocks. A plurality of second gate isolation structures may divide the memory blocks into a plurality of finger memory areas. The top select gate isolation structure disposed in the middle of each finger memory area may divide the finger memory area into two portions, so as to divide the finger memory area into two memory slices (String). One memory block shown in FIG. 3A comprises 6 memory slices. In practical application, the number of memory slices in one memory block is not limited thereto.

It is to be noted that the number of memory cell rows between the gate isolation structure and the top select gate isolation structure shown in FIG. 3A is only an example illustration, which is not configured to limit the number of memory cell rows contained in one finger memory area of the three-dimensional NAND memory in the present disclosure. In practical applications, the number of memory cell rows contained in one finger memory area may be adjusted to, for example, 2, 4, 8, and 16, etc., according to practical situations.

Figure 3B:
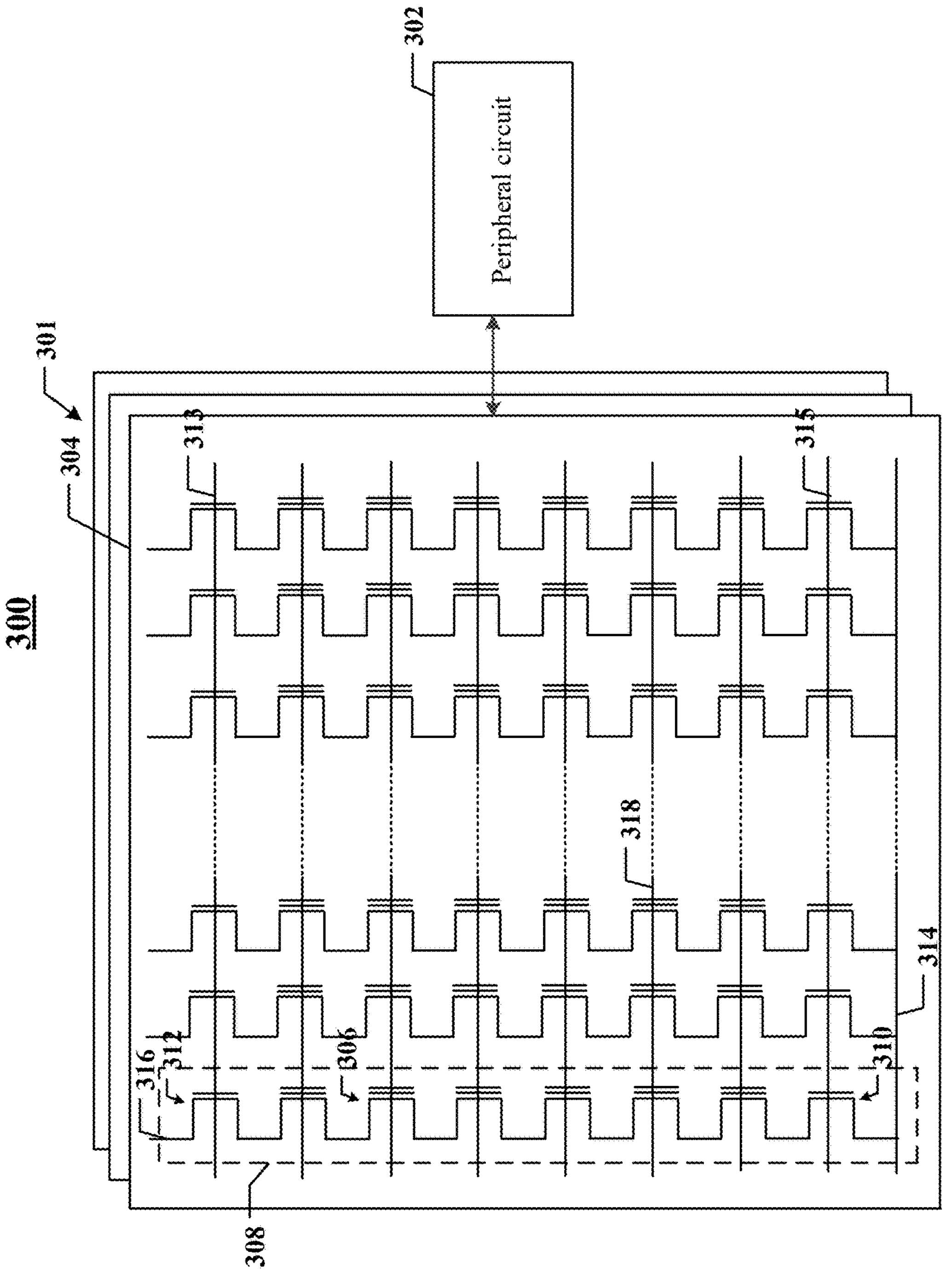
FIG. 3B is a schematic diagram of an example memory device comprising a peripheral circuit according to an example of the present disclosure.

FIG. 3B is a schematic circuit diagram of an example memory comprising a peripheral circuit 302 according to an example of the present disclosure. The memory 300 may be an example of the memory 104 in FIG. 1. The memory 300 may comprise a memory cell array 301 and a peripheral circuit 302 coupled to the memory cell array 301. The memory cell array 301 as being a three-dimensional NAND memory cell array is illustrated as an example, where memory cells 306 are provided in an array of NAND memory strings 308, and each NAND memory string 308 extends vertically above a substrate (not shown). In some implementations, each NAND memory string 308 may comprise a plurality of memory cells 306 coupled in series and stacked vertically. Each memory cell 306 may hold a continuous analog value, such as voltage or charge, which depends on the number of electrons trapped in a zone of the memory cell 306. Each memory cell 306 may be a floating gate memory cell that comprises a floating gate transistor, or a charge trap memory cell that comprises a charge trap transistor.

In some implementations, each memory cell 306 is a Single Level Cell (SLC) that has two possible storage states and thus can store one bit of data. For example, a first storage state "0" may correspond to a first voltage range, and a second storage state "1" may correspond to a second voltage range. In some implementations, each memory cell 306 is a Multi Level Cell (MLC) that is capable of storing more than a single bit of data in more than four storage states. For example, the MLC may store two bits per cell, three bits per cell (also referred to as a Triple Level Cell (TLC)), or four bits per cell (also referred to as a Quad Level Cell (QLC)).

Each MLC can be programmed to take a range of possible nominal memory values. In one example, if each MLC stores two bits of data, the MLC can be programmed to take one of three possible program levels from an erase state by writing one of three possible nominal storage values to the cell. A fourth nominal storage value may be used for the erased state.

As shown in FIG. 3B, each NAND memory string 308 may comprise a bottom select gate (BSG) 310 at its source terminal and a top select gate (TSG) 312 at its drain terminal. The BSG 310 and the TSG 312 may be configured to activate a selected NAND memory string 308 during read and program operations. In some implementations, sources of the NAND memory strings 308 in the same memory block 304 are coupled through the same source line (SL) 314 (e.g., a common SL). For example, according to some implementations, all the NAND memory strings 308 in the same memory block 304 have an array common source (ACS). According to some implementations, the TSG 312 of each NAND memory string 308 is coupled to a respective bit line (BL) 316, and data may be read or written from the bit line 316 via an output bus (not shown). In some implementations, each NAND memory string 308 is configured to be selected or unselected by applying a select voltage (e.g., greater than a threshold voltage of a transistor having the TSG 312) or an unselect voltage (e.g., 0 V) to the respective TSG 312 via one or more TSG lines 313 and/or by applying a select voltage (e.g., greater than a threshold voltage of a transistor having the BSG 310) or an unselect voltage (e.g., 0 V) to the respective BSG 310 via one or more BSG lines 315.

As shown in FIG. 3B, the NAND memory strings 308 can be organized into a plurality of memory blocks 304, and each memory block 304 may have a common source line 314 (e.g., coupled to the ground). In some implementations, each memory block 304 is a basic data unit for the erase operation, e.g., all the memory cells 306 on the same memory block 304 are erased at the same time. In order to erase the memory cells 306 in a selected memory block, the source line 314 coupled to the selected memory block and unselected memory blocks that are in the same plane as the selected memory block can be biased with an erase voltage (Vers) (such as a high positive voltage (e.g., 20 V or higher)). It is to be understood that in some examples, the erase operation may be performed at a half memory block level, a quarter memory block level, or a level having any suitable count of memory blocks or any suitable fractions of a memory block. The memory cells 306 of adjacent ones of the NAND memory strings 308 may be coupled through word lines 318, and the word lines 318 select which row of memory cells 306 is affected by the read and program operations.

Figure 4:
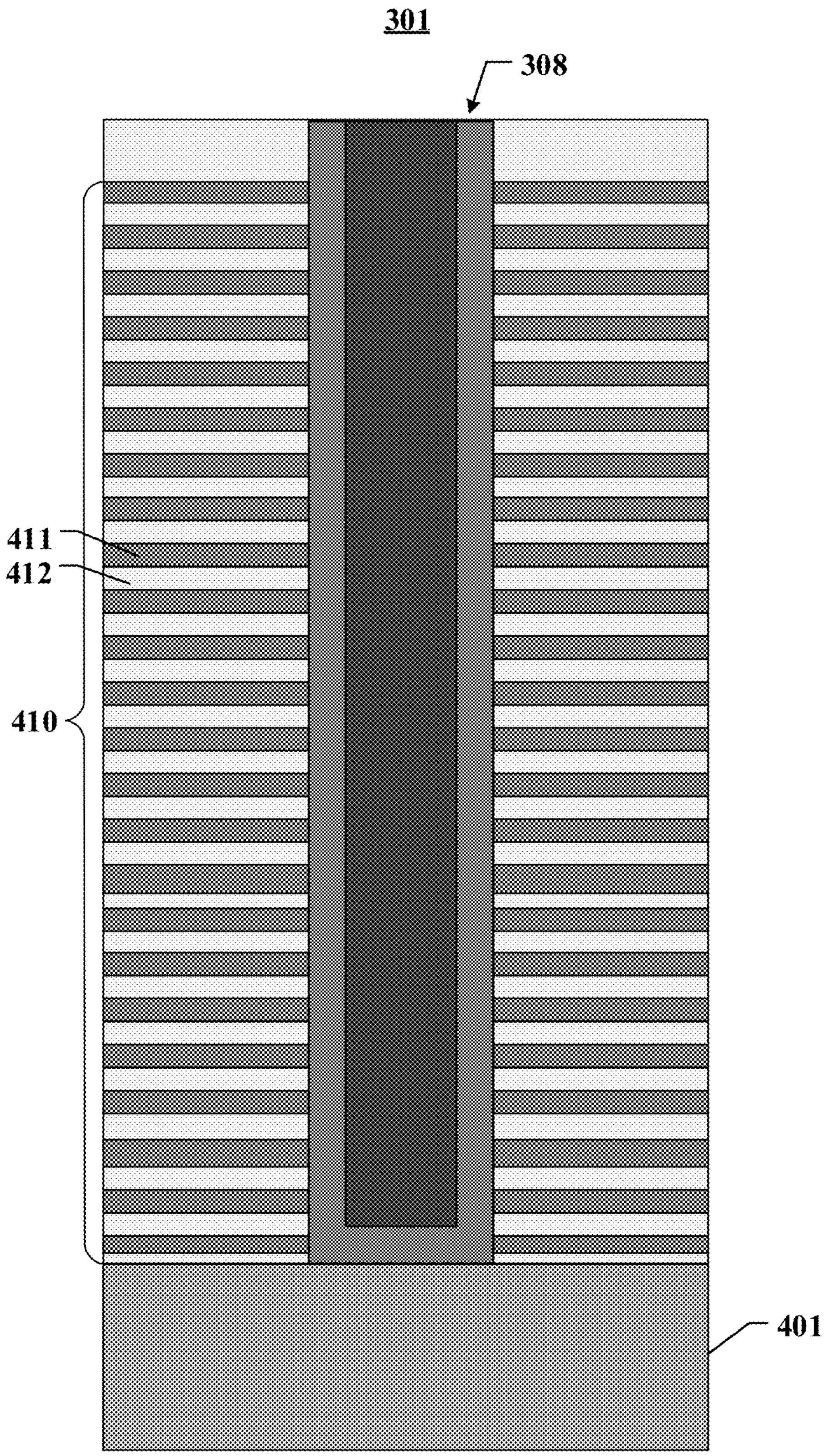
FIG. 4 is a schematic cross-sectional view of a memory cell array of a NAND memory string according to an example of the present disclosure.

FIG. 4 is a schematic cross-sectional view of an example memory cell array 301 comprising a NAND memory string 308 provided by an example of the present disclosure. As shown in FIG. 4, the NAND memory string 308 may comprise a stack structure 410 which comprises a plurality of gate layers 411 and a plurality of insulation layers 412 that are disposed as being stacked sequentially and alternately, and the memory string 308 penetrating through the gate layers 411 and the insulation layers 412 vertically. The gate layers 411 and the insulation layers 412 may be stacked alternately, and two adjacent ones of the gate layers 411 are spaced apart by one insulation layer 412. The number of pairs of the gate layers 411 and the insulation layers 412 in the stack structure 410 may determine the number of memory cells comprised in the memory cell array 301.

A composition material of the gate layers 411 may comprise a conductive material. The conductive material includes, but is not limited to, tungsten (W), cobalt (Co), copper (Cu), aluminum (Al), polysilicon, doped silicon, silicide, or any combination thereof. In some implementations, each gate layer 411 comprises a metal layer, e.g., a tungsten layer. In some implementations, each gate layer 411 comprises a doped polysilicon layer. Each gate layer 411 may comprise a control gate surrounding the memory cells. The gate layer 411 at the top of the stack structure 410 may extend laterally as a top select gate line; the gate layer 411 at the bottom of the stack structure 410 may extend laterally as a bottom select gate line; and the gate layers 411 that extend laterally between the top select gate line and the bottom select gate line may act as word line layers.

In some implementations, the stack structure 410 may be disposed on a semiconductor layer 401. The semiconductor layer 401 may comprise silicon (e.g., single crystalline silicon), silicon germanium (SiGe), gallium arsenide (GaAs), germanium (Ge), silicon on insulator (SOI), germanium on insulator (GOI), or any other suitable materials.

In some implementations, the NAND memory string 308 comprises a channel structure extending through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel includes silicon, e.g., polysilicon. In some implementations, the memory film is a composite dielectric layer comprising a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer, and the barrier layer are arranged radially from the center toward the outer surface of the pillar in this order. The tunneling layer may include silicon oxide, silicon oxynitride, or any combination thereof. The storage layer may comprise silicon nitride, silicon oxynitride, or any combination thereof. The barrier layer may include silicon oxide, silicon oxynitride, a high dielectric constant (high-k) dielectric, or any combination thereof. In an example, the memory film may comprise a composite layer of silicon oxide/silicon oxynitride/silicon oxide (ONO).

Figure 5A:
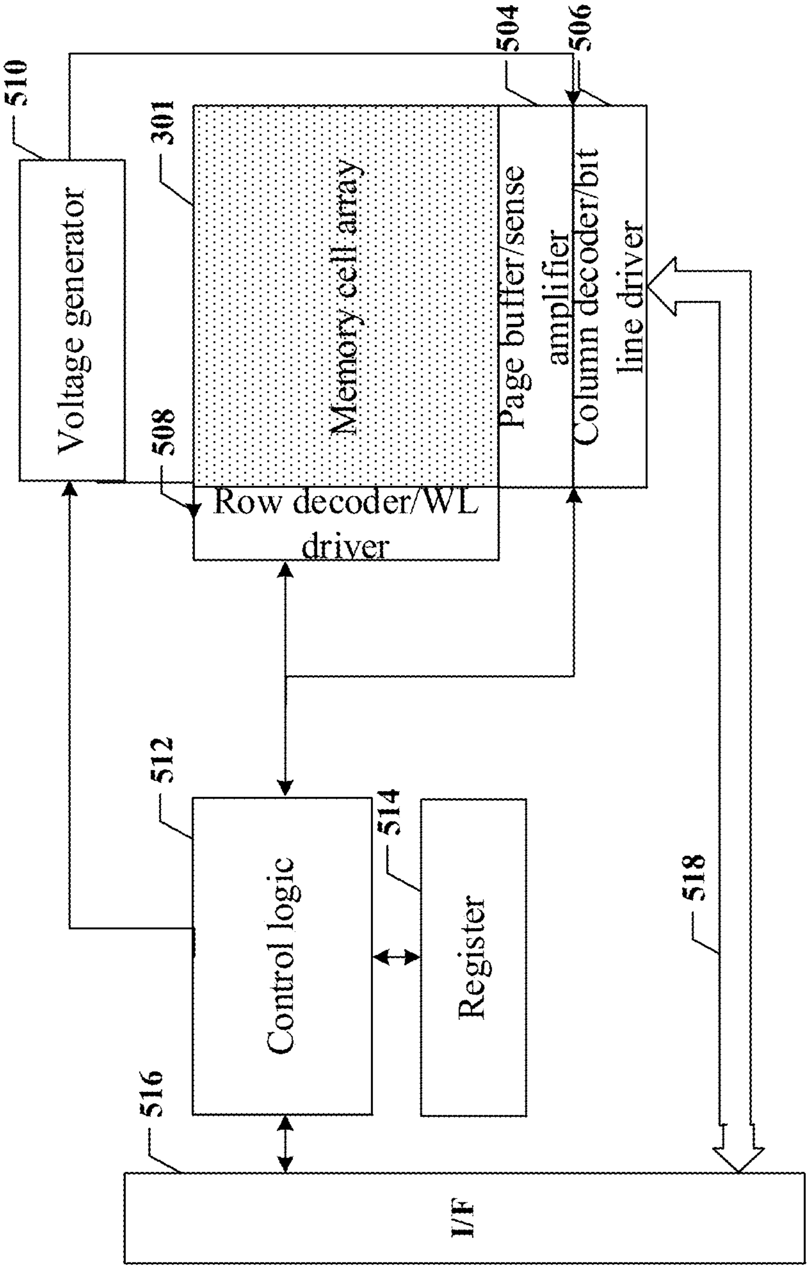
FIG. 5A is a schematic diagram of an example memory device comprising a memory cell array and a peripheral circuit according to an example of the present disclosure.

Referring back to FIG. 3B, the peripheral circuit 302 may be coupled to the memory cell array 301 through the bit line 316, the word line 318, the source line 314, the BSG line 315 and the TSG line 313. The peripheral circuit 302 may comprise any suitable analog, digital, and hybrid signal circuits for facilitating operations of the memory cell array 301 by applying at least one of a voltage signal or a current signal to each target memory cell 306 and sensing at least one of a voltage signal or a current signal from each target memory cell 306 via the bit line 316, the word line 318, the source line 314, the BSG line 315, and the TSG line 313. The peripheral circuit 302 may comprise various types of peripheral circuits formed using the metal-oxide-semiconductor (MOS) technology. FIG. 5A is a schematic diagram of an example memory device comprising a memory cell array and a peripheral circuit according to an example of the present disclosure. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. It is to be understood that, in some examples, an additional peripheral circuit not shown in FIG. 5A may also be comprised.

The control logic 512 may be coupled to each peripheral circuit as described above and configured to control operations of each peripheral circuit. The register 514 may be coupled to the control logic 512 and comprise a state register, a command register, and an address register for storing state information, a command operation code (OP code), and a command address for controlling the operation of each peripheral circuit. The interface 516 may be coupled to the control logic 512, and act as a control buffer to buffer and relay control commands received from a host (not shown) to the control logic 512 and buffer and relay state information received from the control logic 512 to the host. The interface 516 may also be coupled to the column decoder/bit line driver 506 via the data bus 518 and act as a data I/O interface and a data buffer to buffer and relay data to the memory cell array 301 or relay or buffer data from the memory cell array 301. For example, the interface 516 mentioned here is an interface coupled with the back end interface of the memory controller described above. For example, the interface 516 may also be an interface for the memory to communicate with the memory controller.

In some implementations, the page buffer/sense amplifier 504 may be configured to read and program (write) data from and to the memory cell array 301 according to control signals from the control logic 512. In one example, the page buffer/sense amplifier 504 may store program data (write data) to be programmed into the memory cells 306 of the memory cell array 301. In another example, the page buffer/sense amplifier 504 may perform a program verify operation to ensure that data has been properly programmed into the memory cells 306 coupled to the selected word line 318. The column decoder/bit line driver 506 may be configured to be controlled by the control logic 512 and select one or more NAND memory strings 308 by applying a bit line voltage generated from the voltage generator 510.

The row decoder/word line driver 508 may be configured to be controlled by the control logic 512, select/unselect the memory block 304 of the memory cell array 301, and select/unselect the word line 318 of the memory block 304. The row decoder/word line driver 508 may be further configured to drive the word line 318 using a word line voltage generated from the voltage generator 510. In some implementations, the row decoder/word line driver 508 may also select/unselect and drive the BSG line 315 and the TSG line 313. As described below in detail, the row decoder/word line driver 508 is configured to perform the program operation on the memory cells 306 coupled to (one or more) selected word lines 318. The voltage generator 510 may be configured to be controlled by the control logic 512 and generate a word line voltage (e.g., a read voltage, a program voltage, a pass voltage, a channel boost voltage, a verify voltage, etc.), a bit line voltage, and a source line voltage to be supplied to the memory cell array 301.

Figures 5B, 6:
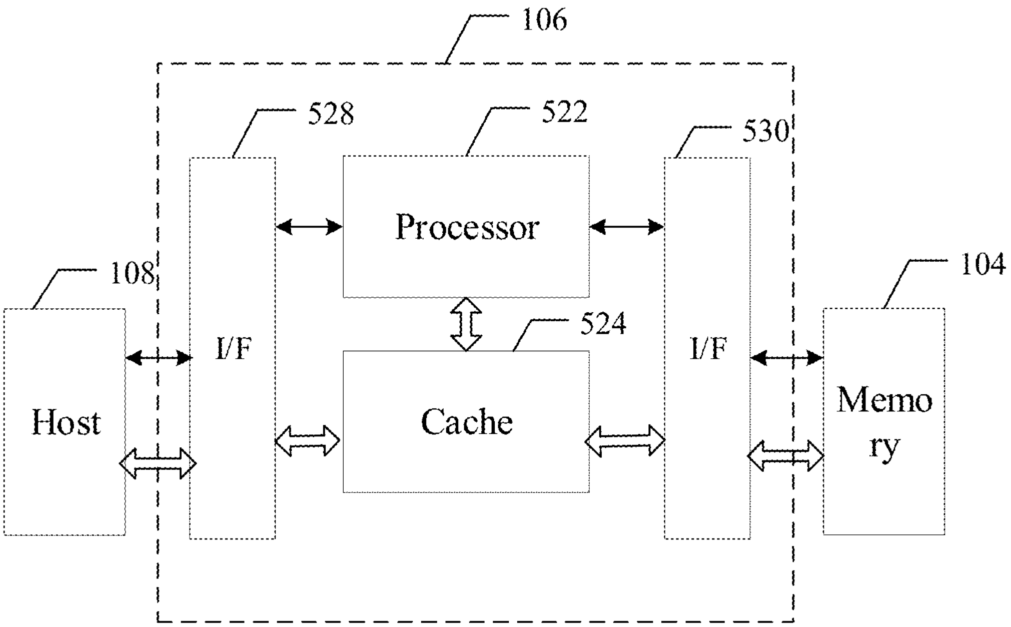
FIG. 5B is a schematic diagram of a memory controller provided by an example of the present disclosure.
FIG. 6 is a schematic structural diagram of a reset write pointer command of ZBCs provided by an example of the present disclosure.

FIG. 5B is a schematic diagram of a memory controller 106 provided by an example of the present disclosure. The memory controller 106 may comprise one or more processors 522 and a memory module. The memory module comprises a cache 524. The memory controller 106 may further comprise an interface (I/F) 528 (e.g., the first interface) coupled with the host 108 and an interface (I/F) 530 (e.g., the back end interface) coupled with the memory 104. Here, the first interfaces are interfaces coupled with the second interface of the host described above. The processor 522 may comprise an arithmetic logic unit (ALU) for performing arithmetic and logic operations. The interface 528 may receive instructions and data from the host 108, and buffer the instructions and data to the processor 522 and the cache 524, respectively. The interface 530 may separately transmit control signals and data from the processor 522 and the cache 524 to the memory 104.

Examples of the present disclosure provide a memory system. Here, regarding particular structures and compositions of the memory system, a reference may be made to related structures and compositions of the memory system 102 in FIG. 1, FIG. 2A, and FIG. 2B. For simplicity, details are no longer repeated here. The memory system comprises a memory and a memory controller coupled with the memory. The memory controller is configured to control the memory to store in zones by zones, where a memory space of a single zone is configured to only support sequential write. The memory controller is configured with a first interface coupled with a host and to receive a first command from the host through the first interface. The first command comprises an identifier of a specified zone and mode switching information of the specified zone. The memory controller is further configured to switch a memory mode of the specified zone to a target memory mode indicated in the mode switching information according to the mode switching information.

In the examples of the present disclosure, the switching of the target memory mode of the specified zone in the memory can be achieved through the first command.

In some implementations, the memory controller is configured to determine a current memory mode of the specified zone, and switch the current memory mode to the target memory mode indicated in the mode switching information according to the mode switching information in a case where the current memory mode is different from the target memory mode.

In some other examples, the memory controller is configured to determine a current memory mode of the specified zone, and not switch the memory mode of the specified zone in a case where the current memory mode is the same as the target memory mode indicated in the mode switching information.

In some implementations, the memory modes comprise a first memory mode and a second memory mode; when the zones are in the first memory mode, each of memory cells corresponding to the memory spaces of the zones is capable to be written n-bit data; when the zones are in the second memory mode, each of the memory cells corresponding to the memory spaces of the zones is capable to be written M-bit data; M and N are integers greater than or equal to 1; and M is greater than N.

As described above, in the NAND memory, the memory cells may be classified into a single level cell (SLC) and a multi-level cell (MLC) according to a difference in memory density. Correspondingly, the first memory mode may be a single level cell (SLC) memory mode, e.g., N=1. The second MEMORY mode may be a multi-level cell (MLC) memory mode, e.g., M is an integer greater than 1. The memory density of the first memory mode is smaller than the memory density of the second memory mode, e.g., N is less than M. The multi-level cell (MLC) memory mode may be at least one of a double-level cell memory mode, a triple-level cell (TLC) memory mode, or a quad-level cell (QLC) memory mode. When M=2, the second memory mode is the double-level cell memory mode; when M=3, the second memory mode is the TLC memory mode; and when M=4, the second memory mode is the QLC memory mode.

In some implementations, the memory controller is configured to: determine the specified zone according to the identifier of the specified zone; and switch the specified zone from the first memory mode to the second memory mode according to the mode switching information; or switch the specified zone from the second memory mode to the first memory mode according to the mode switching information.

Here, a zone for which the memory mode is to be switched may be determined according to the identifier of the specified zone in the first command. The switching of the specified zone between the first memory mode and the second memory mode may be achieved according to the mode switching information in the first command. For example, the function of switching between the first memory mode and the second memory mode may be achieved by only transmitting one command between the host and the memory system.

In a particular example, the first memory mode is the SLC memory mode, and the second memory mode is the TLC memory mode. The switching of the specified zone between the SLC memory mode and the TLC memory mode may be achieved according to the first command.

In some implementations, the zones are zones in a zone name space (ZNS). The ZNS comprises a plurality of zones. A zone is a subinterval of a fixed size in the ZNS. Each zone has logical block address (LBA) interval. The number of logical block addresses corresponding to the zones may be the same. In some implementations, each of a plurality of zones in the ZNS may have the same configuration. Typically, in the ZNS, an external device (e.g., a host) provides definitions of logical block addresses to the memory system. For example, the host may indicate an LBA interval corresponding to a first zone, an LBA interval corresponding to a second zone, and so on. The memory system then maps each zone in the ZNS to a physical block in the memory. For example, the memory system may map the LBA corresponding to the first zone to a first physical block, the LBA corresponding to the second zone to a second physical block, and so on.

In some implementations, a storage capacity of a single zone is lower than a storage capacity corresponding to the physical block of the memory. Herein, the storage capacity may refer to how much memory space the memory provides.

In some implementations, the zone name space (ZNS) may have a preset or adjustable storage capacity. The memory system supporting the zone name space (ZNS) may establish a plurality of zones such that the memory controller may control the memory to store in zones by zones. For example, the data transmitted by the host may be stored in the zones. The memory system may allocate at least one memory block or a portion of one memory block for each zone. The memory system may sequentially store the data transmitted by the host in the zones specified by the corresponding LBAs.

In the memory system supporting the zone name space (ZNS), the zones in the ZNS support only sequential write and do not support random write. The zones in the ZNS may support random read and sequential read.

In some implementations, in addition to the zone name space (ZNS), the memory system may further comprise one or more conventional namespaces (CNSs).

In some implementations, the first command comprises zoned block commands (ZBCs).

For example, the first command may be a command for switching a state of a zone among the ZBCs. In a particular example, the first command may be a reset write pointer command among the ZBCs. Here, the first command is a command complying with a zoned universal flash storage (Zoned UFS) protocol format.

FIG. 6 is a schematic structural diagram of a reset write pointer command of ZBCs provided by an example of the present disclosure. With reference to FIG. 6, the reset write pointer command may further comprise an OPERATION CODE field, a SERVICE ACTION field, an ALL bit, a CONTROL byte, and a reserved field, etc. The fields and information comprised in the reset write pointer command may be understood with reference to a ZBC norm. In the example of FIG. 6, ZONE ID is the identifier of the specified zone, and ZONE MODE is the mode switching information.

In some implementations, the reset write pointer command sent by the host may request the memory controller to perform a reset operation of a write pointer. The reset operation of the write pointer is an operation of resetting the write pointer to an initial value. The initial value of the write pointer may be 0.

Here, the write pointer is configured to indicate a starting LBA of a write operation to be started. The write pointer may be determined by the memory controller and may be assigned to each of the ZNS zones. For example, the memory controller may determine the initial value of the write pointer to indicate a starting point of writing in each zone. For example, when the initial value of the write pointer is 0 (e.g., WP=0), it may indicate that the starting point of writing in the zone is the starting LBA of the zone.

When data is written to the zone, the write pointer is advanced or updated to point to or indicate next LBA for writing data in the zone so as to track a starting point of next write (e.g., a finishing point of previous write is equal to the starting point of subsequent write). Therefore, the write pointer may be configured to indicate where the subsequent write to the zone will be started.

In some implementations, a zone state comprises an empty state, an open state, and a full state. In the empty state, the zone has no valid data, and the write pointer thereof is set as a starting LBA in the zone (e.g., WP=0). After the zone state is switched from the empty state to the open state, the zone may be written with data. In the open state, the zone may have no valid data or may be written with valid data, and the write pointer thereof points to a certain position between ends of the starting LBA and the last LBA in the zone (e.g., WP>0). The memory space corresponding to the zone may receive write data through the write command so as to be written with data. Additionally, the host may clear or erase valid data stored in a zone by resetting the zone such that the zone is reset to the empty state. Once a memory space corresponding to a zone is fully written, the zone is switched to the full state. In the full state, the memory space corresponding to the zone has been fully written and cannot be opened again to receive write data. At this point, the write pointer points to the LBA of next zone. If the zones in the ZNS are all fully written, the write pointer points to an end point of a last LBA of the zone (e.g., WP=ZCAP). Here, ZCAP is the capacity of the zone.

In some implementations, the memory controller is configured to reset the state of the specified zone to the empty state according to the first command.

Since the reset write pointer command may reset the write pointer to the initial value, e.g., point the write pointer to the starting LBA of the zone, the state of the specified zone can be reset to the empty state through the first command.

In some implementations, with reference to FIG. 6, ZONE MODE is the mode switching information which may be contained in an unused reserved field in the reset write pointer command based on the existing ZBC norm. In some implementations, the mode switching information occupies a two-bit field in the reset write pointer command.

In a particular example, the mode reply information occupies the first to second bits of a fourteenth byte in the reset write pointer command.

In a particular example, the mode switching information may be configured to indicate the target memory mode of the specified zone. When the mode switching information is 01 h, it represents that the target memory mode is the first memory mode; and when the mode reply information is 02 h, it represents that the target memory mode is the second memory mode.

In a particular example, when the mode switching information is 00 h, it represents that the memory mode of the specified zone is not switched.

In a particular example, when the memory mode information is 01h, if the current memory mode of the specified zone is the first memory mode, which is the same as the target memory mode indicated in the mode switching information, the memory mode of the specified zone is not switched; and if the current memory mode of the specified zone is the second memory mode, which is different from the target memory mode indicated in the mode switching information, the specified zone is switched from the second memory mode to the first memory mode. When the memory mode information is 02 h, if the current memory mode of the specified zone is the second memory mode, which is the same as the target memory mode indicated in the mode switching information, the memory mode of the specified zone is not switched; and if the current memory mode of the specified zone is the first memory mode, which is different from the target memory mode indicated in the mode switching information, the specified zone is switched from the first memory mode to the second memory mode.

It is to be noted that, when a value of the ALL bit in the reset write pointer command is 1, the memory mode information in the reset write pointer command is ignored.

In some implementations, upon receiving the reset write pointer command, the memory controller is configured to reset the state of the specified zone to the empty state according to the first command, and configure the specified zone to be in the target memory mode in a case where the current memory mode of the specified zone is different from the target memory mode indicated in the mode switching information.

In the examples of the present disclosure, the memory mode of the specified zone is switched according to the reset write pointer command because the reset write pointer command can reset the specified zone to the empty state, ensuring that the memory system has a writable zone for memory mode switching. For example, there is no need to confirm whether a writable zone exists according to other commands, and the function of switching between the first memory mode and the second memory mode can be achieved according to only one command. Thus, the process of interaction between the host and the memory system is simple and takes a short time.

In some implementations, the memory controller is further configured to: receive a zone write request and write data through the first interface, where if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and write the write data to the memory space of the corresponding zone according to the zone write request.

In the examples of the present disclosure, based on cold or hot attributes of write data, the host selectively allocates a zone in the memory mode being the first memory mode to hot data, and a zone in the memory mode being the second memory mode to non-hot data. Thus, after receiving the zone write request and the write data sent by the host, the memory system may write the write data to the corresponding zone based on the zone write request. The non-hot data refers to data of which an access frequency is lower than a set reference value for the memory, and a predetermined storage duration thereof is relatively long. The hot data refers to data of which an access frequency is higher than the set reference value for the memory, and a predetermined storage duration thereof is relatively short. The non-hot data comprises cold data and warm data. An access frequency of the warm data is higher than that of the cold data, but lower than that of the hot data. Accordingly, the zone in the memory mode being the first memory mode may be configured to store the hot data of which the predetermined storage duration is relatively short, and the zone in the memory mode being the second memory mode may be configured to store the non-hot data of which the predetermined storage duration is relatively long. As such, based on the cold or hot attributes of the write data, allocating the zones of the corresponding memory modes to the write data can increase a write speed and a read speed of the hot data.

In some implementations, the memory controller is further configured to: receive a second command through the first interface, where the second command comprises mode reply information for indicating whether memory mode information needs to be returned; and generate report zone parameter data satisfying the indication of the mode reply information according to the second command.

In some implementations, the memory controller is configured to send the report zone parameter data satisfying the indication of the mode reply information to the host according to the second command. In particular, where the mode reply information indicates that the memory mode information of the zones needs to be returned, the report zone parameter data sent by the memory controller to the host through the first interface comprises the memory mode information of the zones; and where the mode reply information indicates that the memory mode information of the zones does not need to be returned, the report zone parameter data sent by the memory controller to the host through the first interface does not comprise the memory mode information of the zones. For example, the memory controller may generate the corresponding report zone parameter data based on the mode reply information in the second command.

In some implementations, the second command comprises zoned block commands (ZBCs). For example, the second command may be a command for acquiring report zone parameter data among the ZBCs. In a particular example, the second command may be a report zone command among the ZBCs. Here, the second command is a command complying with a zoned universal flash storage (Zoned UFS) protocol format.

In some implementations, the report zone command comprises mode reply information indicating whether memory mode information of the zones needs to be returned.

FIG. 7 is a schematic structural diagram of a report zone command of ZBCs provided by an example of the present disclosure. With reference to FIG. 7, the report zone command may further comprise an operation code field, a service action field, a zone start LBA field, an allocation length field, a partial bit, a reporting options field, a control byte, and a reserved field, etc. The fields and information comprised in the report zone command may be understood with reference to a ZBC norm.

In some implementations, the mode reply information is contained in an unused reserved field in the report zone command based on the existing ZBC norm. In some implementations, with reference to FIG. 7, the mode reply information occupies a three-bit field in the report zone command. In a particular example, the mode reply information occupies the sixth to eighth bits of a second byte in the report zone command. In a particular example, when the mode reply information is 01 h, it represents that the memory mode information of the zones needs to be returned; and when the mode reply information is 02 h, it represents that the memory mode information of the zones does not need to be returned.

In some implementations, the mode reply information may be 01 h by default. in some other implementations, the mode reply information may also be fixed as 01 h.

In some implementations, the memory controller is configured to: where the mode reply information is configured to indicate that the memory mode information needs to be returned, generate the report zone parameter data comprising the memory mode information according to the second command.

In some implementations, the memory controller is configured to: when the mode reply information is 01 h, generate the report zone parameter data comprising the memory mode information.

In some other implementations, the memory controller is configured to: where the mode reply information is configured to indicate that the memory mode information of the zones does not need to be returned, generate the report zone parameter data not comprising the memory mode information according to the second command.

In some implementations, the memory controller is configured to: when the mode reply information is 02 h, generate the report zone parameter data not comprising the memory mode information. Here, the report zone parameter data not comprising the memory mode information is the report zone parameter data based on the existing ZBC norm.

FIG. 8A is a schematic structural diagram of report zone parameter data in ZBCs provided by an example of the present disclosure. With reference to FIG. 8A, the report zone parameter data may comprise a zone descriptor list, a public descriptor, and a reserved field, etc.; the zone descriptor list comprises at least one zone descriptor for indicating an own attribute of a corresponding zone; and the public descriptor is configured to indicate a public attribute of a plurality of zones. The public descriptor comprises a zone list length field, a same field, and a maximum LBA field as well as a reserved field, etc.

In some implementations, the memory mode (e.g., NAND mode) information may be in a zone descriptor in the report zone parameter data. Since each zone corresponds to one zone descriptor, the memory mode information is set in the zone descriptor of each zone so that the memory mode of each zone can be known based on the memory mode information in each zone descriptor.

FIG. 8B is a schematic structural diagram of a zone descriptor in report zone parameter data provided by an example of the present disclosure. It is to be noted that FIG. 8B illustrates the zone descriptor comprising the memory mode information. With reference to FIG. 8B, the zone descriptor may further comprise a zone type field, a zone state field, a zone length field, a zone start LBA field, a write pointer LBA field, and a reserved field, etc. The fields and information comprised in the report zone parameter data and the fields and information comprised in the zone descriptor may be understood with reference to the ZBC norm. For example, the zone type field may define an access type of the zone name space. When the zone type field is 02 h, it represents that sequential write is required in the zone name space. For another example, the same field may define the zone type and the zone length in each zone descriptor in the zone descriptor list. When the same field is 1 h, it represents that the zone type and the zone length in each zone descriptor in the zone descriptor list are the same.

In some implementations, the memory mode information may be contained in an unused reserved field in a zone descriptor in a report zone parameter based on the existing ZBC norm. In some implementations, the memory mode information occupies a four-bit field in the zone descriptor. In a particular example, with reference to FIG. 8B, the memory mode information occupies the first to fourth bits of a second byte in a zone descriptor.

In some implementations, the memory mode information is configured to indicate the memory mode of a zone. In a particular example, when the memory mode information is 01 h, it represents that the memory mode of a zone is the first memory mode; and when the memory mode information is 02 h, it represents that the memory mode of the zone is the second memory mode. The first memory mode is the SLC memory mode, and the second memory mode is the TLC memory mode.

In some other implementations, the memory mode information may also be configured to indicate a number of bits of data stored in a memory cell comprised in a memory space of a zone. In a particular example, when the memory mode information is 01 h, it represents that the number of bits of data stored in the memory cell comprised in the memory space of the zone is N; and when the memory mode information is 02 h, it represents that the number of bits of data stored in the memory cell comprised in the memory space of the zone is M, where N=1 and M=3.

In the examples of the present disclosure, on the side of the host, the mode switching information is added to the reset write pointer command so that the mode switching information can be set based on an actual requirement, and the target memory mode of the specified zone can be controlled. Correspondingly, on the side of the memory system, the memory mode of the specified zone can be switched to the target memory mode indicated in the mode switching information according to the mode switching information in the reset write pointer command. In the examples of the present disclosure, the switching of the specified zone between the first memory mode and the second memory mode may be achieved through the existing ZBC command.

In the examples of the present disclosure, the memory mode information of each zone in the zone name space (ZNS) can be known by means of the report zone command so that the memory mode of each zone can be known. As such, when writing data, based on cold or hot attributes of write data, a zone in the memory mode being the first memory mode may be selectively allocated to hot data, and a zone in the memory mode being the second memory mode may be selectively allocated to non-hot data. As such, a write speed and a read speed of the hot data can be increased.

Figure 9:
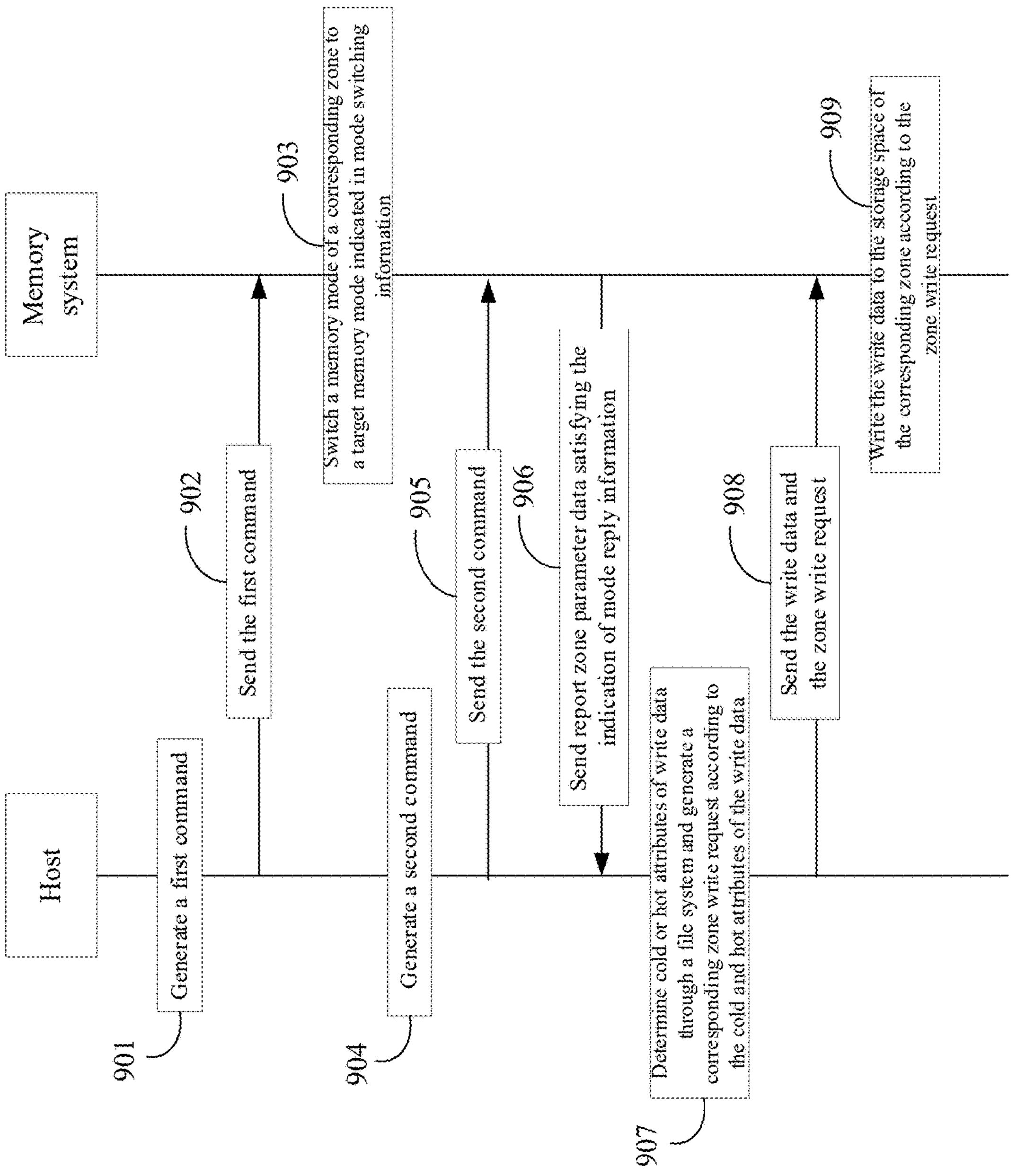
FIG. 9 is a flow diagram I of interaction between a memory system and a host provided by an example of the present disclosure.

Examples of the present disclosure provide a system. Here, regarding particular structures and compositions of the system, a reference may be made to related structures and compositions of FIG. 1. For simplicity, details are no longer repeated here. FIG. 9 is a flow diagram I of interaction between a memory system and a host provided by an example of the present disclosure. A working flow of the system is described with reference to FIG. 9 and FIG. 1. The system comprises: a memory system and a host, where the memory system comprises: a memory and a memory controller coupled with the memory, where the memory controller is configured to control the memory to store in zones by zones, where a memory space of a single zone is configured to only support sequential write; and the host comprises a host controller and a second interface coupled with the memory controller. At operation 901, the host controller is configured to generate a first command. At operation 902, the first command is sent to the memory controller through the second interface, where the first command comprises an identifier of a specified zone and mode switching information of the specified zone; and the memory controller is configured with a first interface coupled with the host, and the memory controller receives the first command from the host through the first interface. At operation 903, the memory controller switches the memory mode of the specified zone to the target memory mode indicated in the mode switching information according to the first command.

In an example, the memory controller switches the memory mode of the specified zone to the target memory mode indicated in the mode switching information according to the mode switching information.

In some implementations, the first command comprises a reset write pointer command; and the mode switching information occupies a two-bit field in the reset write pointer command. The reset write pointer command may be understood with reference to FIG. 6, which is no longer repeated here.

In some implementations, the operation 903 is specifically as follows: the memory controller is configured to determine a current memory mode of the specified zone, and switch the current memory mode to the target memory mode according to the mode switching information in a case where the current memory mode is different from the target memory mode indicated in the mode switching information.

The memory modes comprise a first memory mode and a second memory mode. When the zones are in the first memory mode, each of memory cells corresponding to the memory spaces of the zones is capable to be written N-bit data; and when the zones are in the second memory mode, each of the memory cells corresponding to the memory spaces of the zones is capable to be written M-bit data. In an example, N is 1 and M is 3. For example, the first memory mode may be the SLC memory mode and the second memory mode may be the MLC memory mode.

In some implementations, the operation 903 is specifically as follows: the memory controller is configured to: determine the specified zone according to the identifier of the specified zone; and switch the specified zone from the first memory mode to the second memory mode according to the mode switching information; or switch the specified zone from the second memory mode to the first memory mode according to the mode switching information.

In some implementations, at operation 904, the host controller is configured to generate a second command. At operation 905, the second command is sent to the memory controller through the second interface. The second command comprises mode reply information for indicating whether the memory mode information needs to be returned. At operation 906, the memory controller is configured to receive the second command through the first interface, and generate report zone parameter data satisfying the indication of the mode reply information according to the second command and send the report zone parameter data to the host controller.

In some implementations, the second command comprises a report zone command; and the mode reply information occupies a three-bit field in the report zone command. The report zone command may be understood with reference to FIG. 7, which is no longer repeated here.

In some implementations, the host is configured with a file system. At operation 907, the host controller is configured to determine cold or hot attributes of write data by the file system and generate corresponding zone write requests according to the cold or hot attributes of the write data. At operation 908, the write data and the zone write requests are send to the memory controller through the second interface. If the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode. At operation 909, the memory controller is configured to write the write data to the memory spaces of the corresponding zones according to the zone write requests.

In an example, if the write data is the hot data, the zone write request is configured to indicate that the write data is written to the zone in the memory mode being the first memory mode. At this point, the memory controller writes the write data to the memory space of the zone in the memory mode being the first memory mode according to the zone write request. If the write data is the non-hot data, the zone write request is configured to indicate that the write data is written to the zone in the memory mode being the second memory mode. At this point, the memory controller writes the write data to the memory space of the zone in the memory mode being the second memory mode according to the zone write request.

Figure 10A:
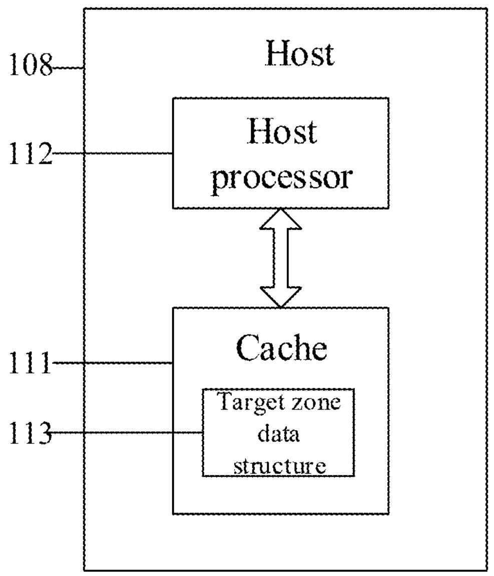
FIG. 10A is a block diagram I of a host provided by an example of the present disclosure.

FIG. 10A is a block diagram I of a host provided by an example of the present disclosure. With reference to FIG. 10A, the host 108 comprises a cache 111 and a host processor 112, where the cache 111 may be a random access memory (RAM). The cache 111 may be configured to store instructions and data and may be randomly accessed directly by the host processor 112. In an example, the cache 111 may be configured to store a target zone data structure 113. The host processor 112 is an operation and control core of the host 110 and a final execution unit for information processing and program running.

Figure 10B:
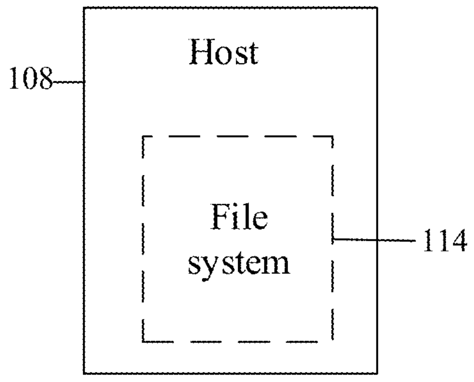
FIG. 10B is a block diagram II of a host provided by an example of the present disclosure.

FIG. 10B is a block diagram of a host provided by examples of the present disclosure. With reference to FIG. 10B, in the examples of the present disclosure, the host 108 is further configured with a file system 114, where the file system 114 processes input data such that the input data is stored in a particular logic or physical position in the memory system. For example, when the host 108 receives data through a user application (not shown), the host 108 may use the file system 114 to process the data and then store the data in the memory system.

In some examples, the file system 114 may comprise a log-structured file system (LFS), e.g., a flash friendly file system (F2FS) designed for Linux kernel based on a flash characteristic, or a journaling flash file system (JFFS) as LinuxLFS related to a NOR flash device. The F2FS may perform cold and hot separation on the write data from the user according to an access frequency of the write data from the user. In an example, the F2FS may separate the write data from the user into hot data, warm data, and cold data according to the access frequency of the write data from the user. Both of the warm data and the cold data are non-hot data.

In the examples of the present disclosure, the file system 114 may create a target zone data structure which may be stored in the cache 111.

In some implementations, with reference to FIG. 9, operation 906 is specifically as follows: the memory controller is configured to generate the report zone parameter data comprising the memory mode information according to the second command and send the report zone parameter data to the host controller, in a case where the mode reply information being configured to indicate that the memory mode information of the zones needs to be returned. In an example, the memory mode information may be in a zone descriptor in the report zone parameter data. The memory mode information occupies a four-bit field in the zone descriptor. The report zone parameter data and the zone descriptor may be understood with reference to FIG. 8A and FIG. 8B, which are no longer repeated here. The memory mode information is configured to indicate the memory mode of a zone. In a particular example, the memory mode information occupies the first to fourth bits of the second byte in the zone descriptor. When the memory mode information is 01 h, it represents that the memory mode of a zone is the first memory mode; and when the memory mode information is 02 h, it represents that the MEMORY MODE of the zone is the second memory mode.

In some implementations, the host is configured with a file system; and a host processor is configured to: establish a target zone data structure through the file system, where the target zone data structure is configured to store information of a target zone, and the target zone is a zone in the memory mode being the first memory mode; obtain the information of the target zone according to the report zone parameter data comprising the memory mode information; and store the information of the target zone to the target zone data structure.

Figure 11:
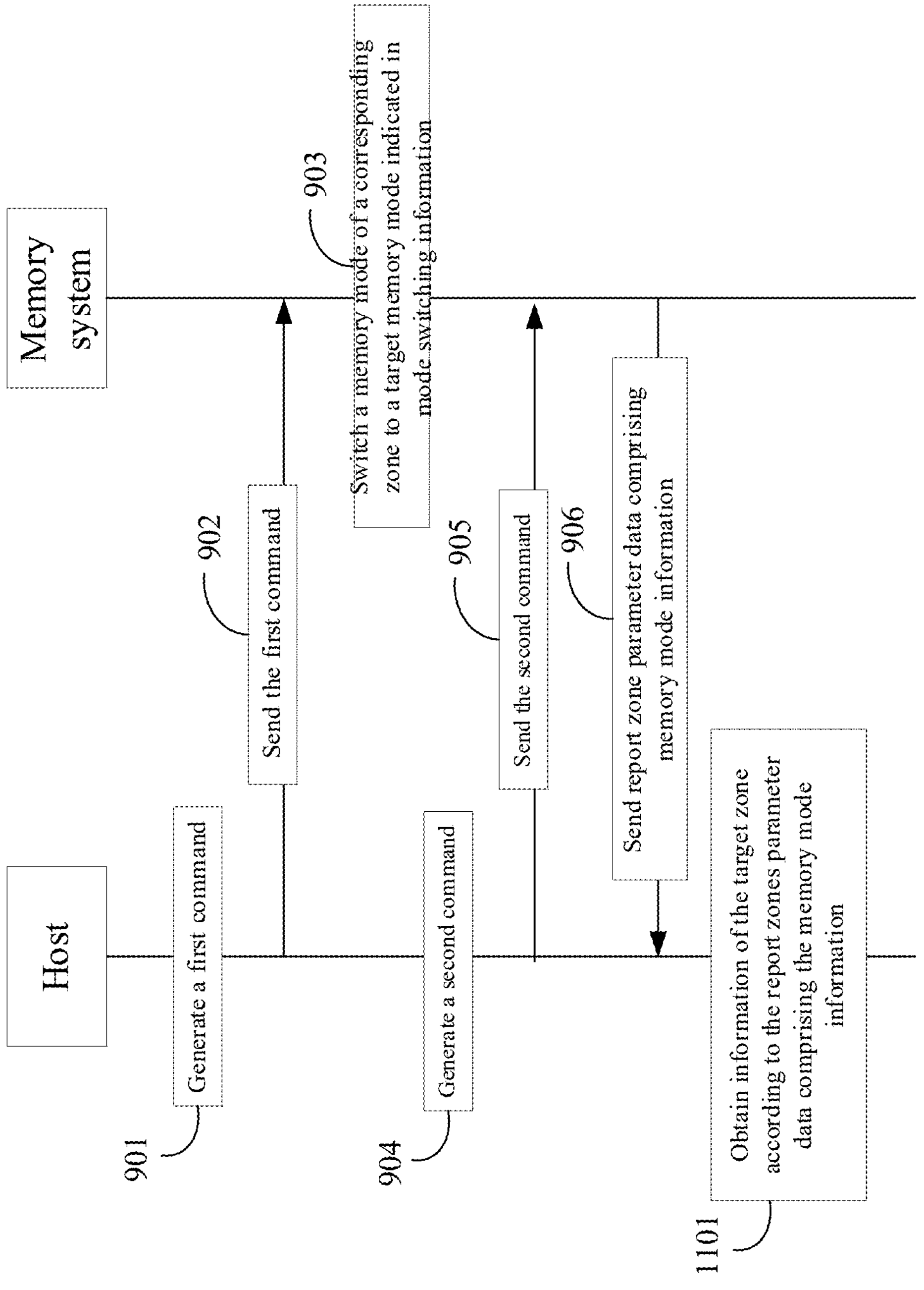
FIG. 11 is a flow diagram II of interaction between a memory system and a host provided by an example of the present disclosure.

FIG. 11 is a flow diagram II of interaction between a memory system and a host provided by an example of the present disclosure. All the operations may not need to be performed in the interaction between the memory system and the host illustrated in FIG. 9 and FIG. 11, and the operations as shown in FIG. 9 and FIG. 11 may not be exclusive, and other operations can also be performed before, after, or between any of the illustrated operations. Furthermore, some of the operations may be performed simultaneously or performed in a different order from that shown in FIG. 9 and FIG. 11. A working flow of the system is described with reference to FIG. 11, FIG. 9 and FIG. 1. With reference to FIG. 11, the system comprises: a memory system and a host, where the memory system comprises: a memory and a memory controller coupled with the memory, where the memory controller is configured to control the memory to store in zones by zones, where a memory space of a single zone is configured to only support sequential write; and the host comprises a host controller and a second interface coupled with the memory controller. At operation 901, the host controller is configured to generate a first command. At operation 902, the first command is sent to the memory controller through the second interface, where the first command comprises an identifier of a specified zone and mode switching information of the specified zone; and the memory controller is configured with a first interface coupled with the host, and the memory controller receives the first command from the host through the first interface. At operation 903, the memory controller switches the memory mode of the specified zone to the target memory mode indicated in the mode switching information according to the first command.

At operation 904, the host controller is configured to generate a second command. At operation 905, the second command is sent to the memory controller through the second interface. The second command comprises mode reply information for indicating whether the memory mode information needs to be returned. At operation 906, the memory controller is configured to generate report zone parameter data comprising the memory mode information according to the second command and send the report zone parameter data to the host controller in a case where the mode reply information being configured to indicate that the memory mode information of the zones needs to be returned. At operation 1101, the host processor is configured to: obtain the information of the target zone according to the report zone parameter data comprising the memory mode information; and store the information of the target zone to the target zone data structure.

In some implementations, the target zone is a zone in the memory mode being the SLC memory mode. The "zone in the memory mode being the SLC memory mode" is called "an SLC zone" for short. The host processor obtains the information of the SLC zone according to the report zone parameter data comprising the memory mode information, and stores the information of the SLC zone to the target zone data structure. A non-target zone is a zone in the memory mode being the TLC memory mode. The "zone in the memory mode being the TLC memory mode" is called "a TLC zone" for short.

In some implementations, where the mode reply information is configured to indicate that the memory mode information of the zones needs to be returned, the host may acquire the report zone parameter data comprising the information of the zones according to the second command. For example, the report zone parameter data comprises both the information of the SLC zone and the information of the TLC zone, but the host only stores the information of the SLC to the target zone data structure. In the examples of the present disclosure, a target zone data structure is added in the host and configured to manage the information of the SLC in the memory system so that the host processor can write hot data to the SLC zone, thereby effectively increasing a write speed of the hot data.

In some implementations, the target zone data structure is configured to store the number of the target zones, a target zone chain table list and an identifier of the currently used target zone, where a zone chain table list comprises at least one zone chain table, and a target zone chain table comprises the identifier of the target zone, a state of the target zone, and a chain table pointer of next target zone chain table.

FIG. 12 is diagram illustrating a target zone data structure provided by an example of the present disclosure. It is to be noted that FIG. 12 is described by taking as an example that the target zone is an SLC zone. With reference to FIG. 12, a target zone data structure named as struct f2fs_SLC_ZONE_info is created in the F2FS. In the target zone data structure, slc_zone_count represents the number of SLC zones in the memory; current_slc_zone_id represents an identifier of the SLC zone used by the current hot data; struct SLC_NAND slc_nand_zone represents an SLC zone chain table list; and the information of all the SLC zones is recorded in the SLC zone chain table list. In a target zone chain table, ZONE_ID represents the identifier of the SLC zone, and ZONE_STATE represents the state of the SLC zone. In an example, the state of the SLC zone comprises an empty state (1$h$: EMPTY), an open state (2$h$: OPEN), and a full state (Eh: FULL). SLC_NAND*next represents a chain table pointer of next SLC zone chain table.

In some implementations, the host processor is configured to: in a preset scenario, send the first command to the memory controller through the second interface, where the preset scenario comprises at least one of: an initialization period of the file system, a case where the information of the target zone is not acquired according to the second command, and a case where the state of the currently used target zone in the target zone data structure is a full state.

Figure 13:
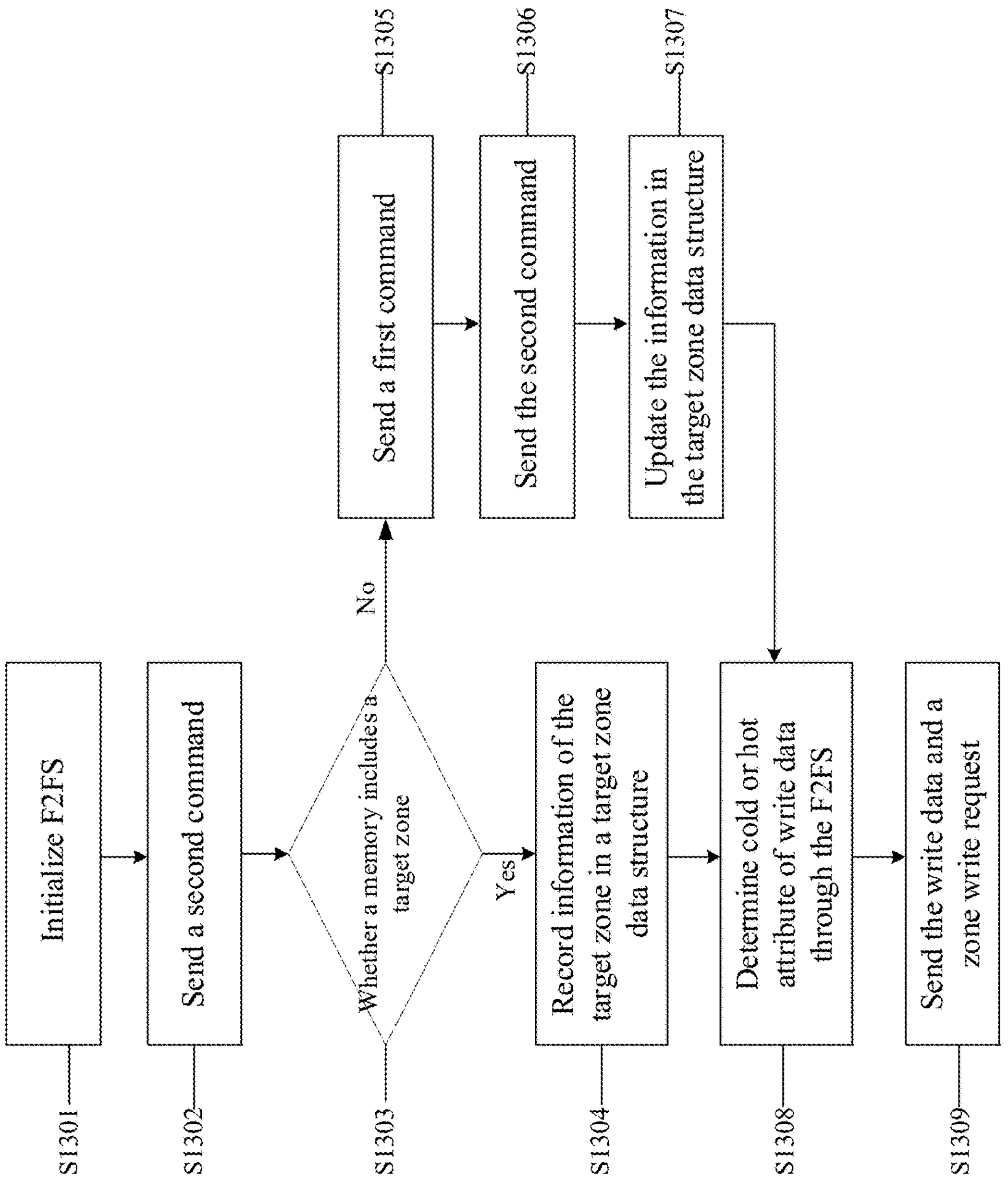
FIG. 13 is a flow diagram I of an operation method of a host provided by an example of the present disclosure.

FIG. 13 is a flow diagram I of an operation method of a host provided by an example of the present disclosure. With reference to FIG. 13, in one example of the present disclosure, at operation S1201, F2FS is initialized. At operation S1302, a host processor may be configured to send a second command to a memory system. As such, the host processor may acquire information of zones in a memory according to the second command. At operation S1303, whether there is the target zone in the memory is determined according to the report zone parameter data comprising the memory mode information. In an example, the target zone is an SLC zone. If there is the SLC zone in the memory, operation S1304 is performed, e.g., the host processor records the information of the target zone in a target zone data structure. If there is no SLC zone in the memory, operation S1305 is performed, e.g., the host processor is configured to send a first command to the memory system such that the memory processor is instructed to configure at least one zone in the memory as the SLC zone according to the first command. Here, since a memory controller may be instructed to switch the memory mode of the specified zone to the target memory mode according to the first command, mode switching information generated by the host may indicate that the target memory mode is a first memory mode, and the first command carrying an identifier of a specified zone and mode switching information thereof may instruct the memory controller to switch the memory mode of the specified zone to the first memory mode. Thus, the configuration of the target zone can be realized according to the first command.

At operation S1306, the host processor sends the second command to the memory system again to acquire the report zone parameter data comprising the memory mode information again. Since the SLC zone has been configured according to the first command prior to the operation 1306, the report zone parameter data acquired by the operation 1306 has the information of the SLC zone. On this basis, at operation S1307, the information in the target zone data structure is updated according to the newly acquired information of the target zone. For example, the information of the SLC zone configured through the operation 1305 is updated to the target zone data structure.

At operation S1308, when the host needs to write data to the memory, the host processor may determine cold or hot attributes of the write data through F2FS. Subsequently, the host processor generates corresponding zone write requests according to the cold or hot attributes of the write data, and sends the write data and the zone write requests to the memory system at operation S1309. At this point, if the write data is determined as hot data, the zone write request indicates that the write data is written to the SLC zone. If the write data is determined as non-hot data, the zone write request indicates that the write data is written to a non-target zone. In an example, the non-target zone is a TLC zone.

In a particular example, when the host processor determines the write data as the hot data through the F2FS, the host processor may send the write data and a zone write request to the memory system according to current_slc_zone_id in the target zone data structure so as to indicate that the write data is written to the SLC zone corresponding to the identifier. For example, if the host processor determines the write data as the hot data through the F2FS, the host processor sends the hot data and a zone write request to the memory system, where the zone write request comprises the identifier of the SLC zone in a non-full state (e.g., an empty state or an open state) currently used by the hot data. In an example, if the host processor determines the write data as the hot data through the F2FS for the first time, the zone write request comprises the identifier of the first SLC zone in the non-full state pointed after the initialization of the F2FS.

In the examples of the present disclosure, after the current hot data is written to the memory, if the SLC zone used by the current hot data is in a full state, current_slc_zone_id in the target zone data structure points to next SLC zone in the non-full state such that next hot data is written. It is to be noted that, at this point, if there is no SLC zone in the non-full state available for writing the hot data, the host processor needs to send the first command to the memory system such that at least one zone in the non-full state is configured as the SLC zone.

When the host processor determines the write data as the non-hot data through the F2FS, the host processor may sequentially select a zone in the non-full state, and traverse the SLC zone chain table in the target zone data structure to determine whether the currently selected zone is the SLC zone. If this zone is determined as the SLC zone, this zone is skipped over and next zone is selected until a TLC zone, e.g., a zone in the memory mode being a second memory mode, is found. Subsequently, at operation S1309, the write data and the zone write request are sent to indicate that the write data is written to the TLC zone.

Figure 14:
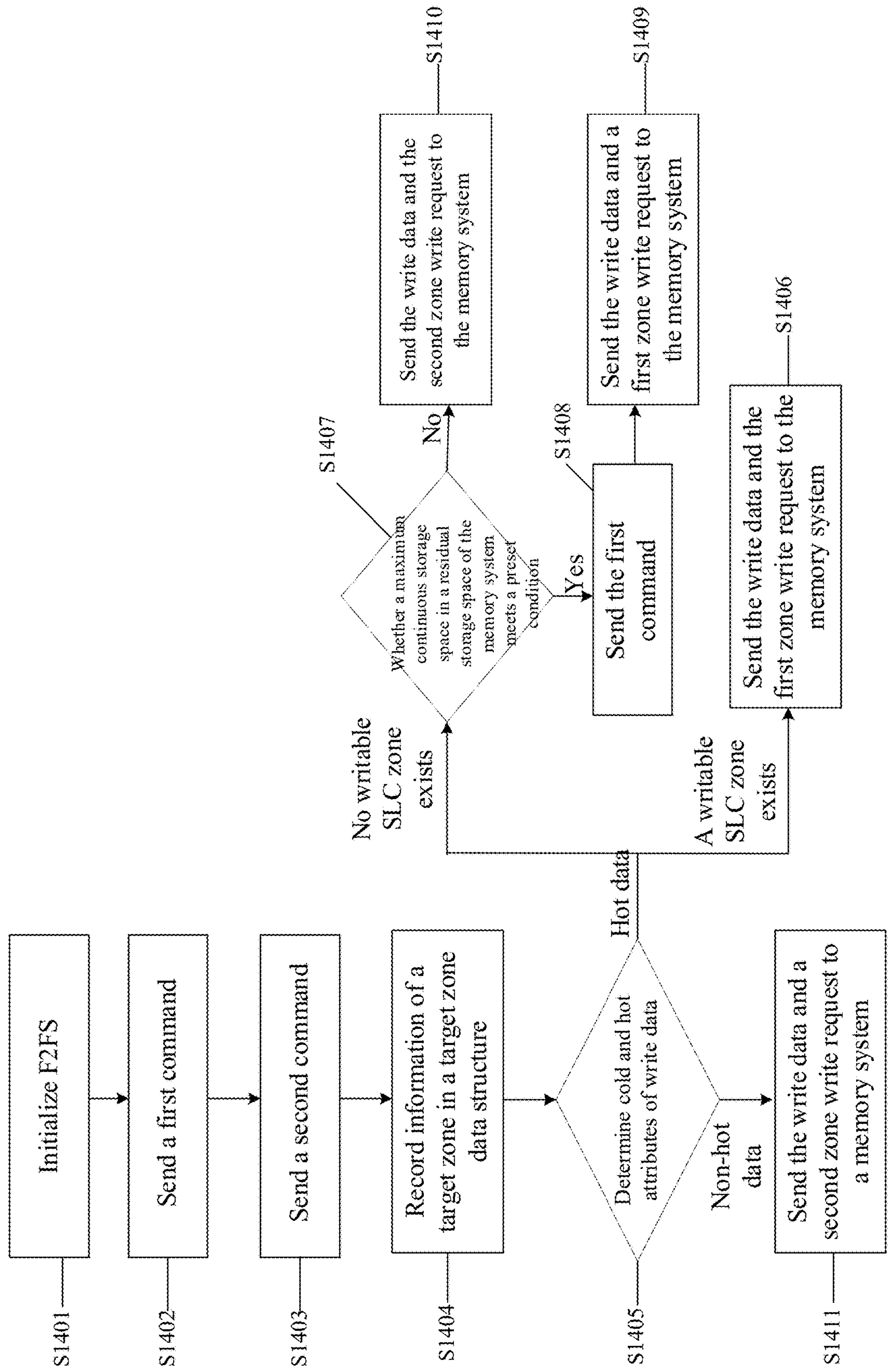
FIG. 14 is a flow diagram II of an operation method of a host provided by an example of the present disclosure.

FIG. 14 is a flow diagram II of an operation method of a host provided by an example of the present disclosure. With reference to FIG. 14, in another example of the present disclosure, at operation S1401, F2FS is initialized. At operation S1402, a host processor may send a first command to a memory system. Here, the first command may be configured to indicate that at least one zone in a memory is configured as a target zone. As such, it may be ensured that there is at least one target zone in the memory. In an example, the target zone is an SLC zone. In an example, the first command may be configured to indicate that first one third zones of a plurality of zones in the memory are configured as the SLC zones. For example, specified zones are the first one third zones of the plurality of zones in the memory. Thus, the memory controller may configure the first one third zones of the plurality of zones in the memory as the SLC zones according to identifiers of the specified zones in the first command.

At operation S1403, the host processor sends a second command to the memory system to acquire the information of the SLC zones in the memory. At operation S1404, the information of the SLC zones is updated to a target zone data structure.

In further another example of the present disclosure, where a state of the currently used SLC zone in the target zone data structure is a full state, the host processor may send the first command to the memory system to indicate that at least one zone in the memory is configured as the SLC zone. Subsequently, the host processor sends a second command to the memory system and acquires the information of all zones in the memory. The data in the target zone data structure is updated according to the acquired information of the SLC zones of all the zones.

It is to be needed that in the examples of the present disclosure, after the host processor sends the first command to the memory system each time, the host processor further needs to send the second command to the memory system to realize the updating of the data in the target zone data structure.

At operation S1405, cold or hot attributes of write data are determined. Where the write data is hot data, whether there is a writable SLC zone in a zone data structure is determined. Where there is the writable SLC zone in the zone data structure, operation S1406 is performed, e.g., the write data and a first zone write request are sent to the memory system such that the memory system is instructed to write the hot data to the SLC zone. Here, the first zone write request is configured to indicate that the write data is written to the SLC zone.

Where there is no writable SLC zone in the zone data structure, e.g., where the state of the currently used SLC zone is the full state, operation S1407 is performed. At the operation S1407, whether a maximum continuous memory space in a residual memory space in the memory system meets a preset condition is determined. In an example, the preset condition may be the maximum continuous memory space in the residual memory space in the memory system being larger than or equal to a memory space occupied by two non-target zones. In an example, the non-target zones are TLC zones. If the maximum continuous memory space in the residual memory space of the memory system meets the preset condition, operation S1408 is performed, where the host processor sends the first command to the memory system such that the memory space corresponding to at least one zone of the maximum continuous memory space in the residual memory space is configured as the SLC zone. In an example, a half of the maximum continuous memory space in the residual memory space may be configured as the SLC zone. Subsequently, the host processor may send the second command to the memory system to update and maintain the target zone data structure. Moreover, at operation S1409, the write data and the first zone write request are sent to the memory system such that the memory system is instructed to write the hot data to the SLC zone. If the maximum continuous memory space in the residual memory space of the memory system does not meet the preset condition, since the preset condition is not met, the configuration of the SLC zone cannot be performed, and the host cannot allocate a writable SLC zone for the hot data. Thus, operation S1410 is performed, e.g., the write data and a second zone write request are sent to the memory system such that the memory system is instructed to write the hot data to a TLC zone.

If the write data is determined as non-hot data at the operation S1405, operation S1411 is performed. At the operation S1411, the write data and the second zone write request are sent to the memory system such that the memory system is instructed to write the non-hot data to the TLC zone.

The descriptions of the system examples are similar to the descriptions of the above memory system examples, and have beneficial effects similar to the memory system examples. Technical details that are not disclosed in the system examples of the present disclosure are determined with reference to the descriptions of the memory system examples of the present disclosure.

Figure 15:
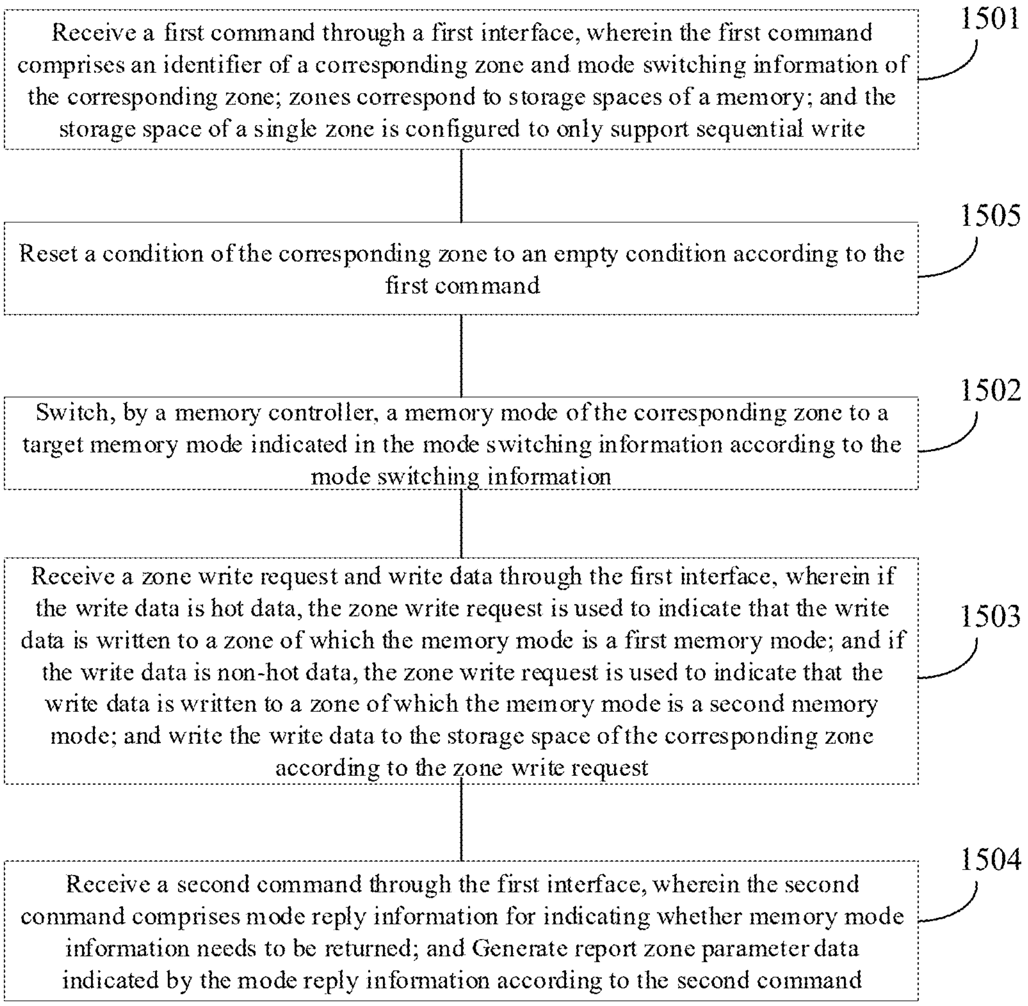
FIG. 15 is a flow diagram of an operation method of a memory system provided by an example of the present disclosure.

FIG. 15 is a flow diagram of an operation method of a memory system provided by an example of the present disclosure. Here, particular structures and compositions with respect to the memory system may be referred to related structures and compositions of the memory system 102 in FIG. 1, FIG. 2A, and FIG. 2B. For simplicity, details are no longer repeated here. The operations as shown in FIG. 15 may not be exclusive, and other operations can also be performed before, after, or between any of the illustrated operations. Furthermore, some of the operations may be performed simultaneously or performed in a different order from that shown in FIG. 15.

At operation 1501, a first command is received through a first interface, where the first command comprises an identifier of a specified zone and mode switching information of the specified zone; zones correspond to memory spaces of the memory; and the memory space of a single zone is configured to support sequential write.

At operation 1502, a memory mode of the specified zone is switched by a memory controller to a target memory mode indicated in the mode switching information according to the mode switching information.

In some implementations, the operation 1502 comprises: determining a current memory mode of the specified zone, and switching the current memory mode to the target memory mode according to the mode switching information in a case where the current memory mode is different from the target memory mode indicated in the mode switching information.

In some implementations, the memory modes comprise a first memory mode and a second memory mode; when the zones are in the first memory mode, each of memory cells corresponding to the memory spaces of the zones is capable to be written N-bit data; when the zones are in the second memory mode, each of the memory cells corresponding to the memory spaces of the zones is capable to be written M-bit data; M and N are integers greater than or equal to 1; and M is greater than N.

In some implementations, the operation 1502 comprises: determining the specified zone according to the identifier of the specified zone; and switching the specified zone from the first memory mode to the second memory mode according to the mode switching information; or switching the specified zone from the second memory mode to the first memory mode according to the mode switching information.

In some implementations, at operation 1503, a zone write request and write data are received through the first interface, where if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and the write data is written to the memory space of the corresponding zone according to the zone write request.

In some implementations, at operation 1504, a second command is received through the first interface, where the second command comprises mode reply information for indicating whether memory mode information needs to be returned; and report zone parameter data indicated by the mode reply information is generated according to the second command. It is to be noted that there is no obvious sequential order relationship between the operation 1504 and the operation 1503, and the operation 1504 may be performed prior to the operation 1501 or may be performed after the operation 1501.

In some implementations, where the mode reply information is configured to indicate that the memory mode information needs to be returned, the operation 1504 comprises: generating the report zone parameter data comprising the memory mode information according to the second command.

In some implementations, the memory mode information is in a zone descriptor in the report zone parameter data.

In some implementations, the memory mode information occupies a four-bit field in the zone descriptor.

In some implementations, the report zone parameter data comprises a zone descriptor list and a public descriptor; the zone descriptor list comprises at least one zone descriptor for indicating an own attribute of a corresponding zone; and the public descriptor is configured to indicate a public attribute of a plurality of the zones.

In some implementations, the zone descriptor further comprises a zone type field, a zone state field, a zone length field, a zone start logical block address field, and a write pointer logical block address field.

In some implementations, the public descriptor comprises a zone list length field, a same field, and a maximum logical block address field, etc.

In some implementations, the first command comprises a reset write pointer command; and the mode switching information occupies a two-bit field in the reset write pointer command.

In some implementations, the second command comprises a report zone command.

In some implementations, the zones are zones in a zone name space (ZNS).

In some implementations, prior to the operation 1502, the method further comprises operation 1505: resetting a state of the specified zone to an empty state according to the first command.

The descriptions of the operation method examples of the memory system are similar to the descriptions of the above memory system examples, and have beneficial effects similar to the memory system examples. Technical details that are not disclosed in the operation method examples of the memory system of the present disclosure are determined with reference to the descriptions of the method examples of the present disclosure.

In the examples of the present disclosure, on the side of the host, the mode switching information is added to the reset write pointer command so that the mode switching information can be set based on an actual requirement, and the target memory mode of the specified zone can be controlled. Correspondingly, on the side of the memory system, the memory mode of the specified zone can be switched to the target memory mode indicated in the mode switching information according to the mode switching information in the reset write pointer command. In the examples of the present disclosure, the switching of the specified zone between the first memory mode and the second memory mode may be achieved according to the existing ZBC command.

In the examples of the present disclosure, the memory mode information of each zone in the zone name space (ZNS) can be known by means of the report zone command so that the memory mode of each zone can be known. As such, when writing data, based on cold or hot attributes of write data, a zone in the memory mode being the first memory mode may be selectively allocated to hot data, and a zone in the memory mode being the second memory mode may be selectively allocated to non-hot data. As such, a write speed and a read speed of the hot data can be increased.

In the examples of the present disclosure, the host is provided with a target zone data structure which may be configured to manage the information of the target zone in the memory mode being the first memory mode. Meanwhile, the host may acquire the information (including the memory mode information) of the zones in the ZNS according to the first command, and thus can know the information of the target zone and maintain the target zone data structure based on the information of the target zone.

Examples of the present disclosure further provide a computer readable storage medium, storing a computer program which, when executed, implements the operation method of a memory system in the examples of the present disclosure.

In some examples, the computer readable storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a CD-ROM (Compact Disc Read-Only Memory) and other memories, or various apparatuses comprising any one or any combination of the above memory devices.

In some examples, a computer program may be compiled in any form of programming language (comprising a compiling or interpreting language, or a declarative or procedural language) by adopting a form of a program, a software, a software module, a script or a code; and it may be deployed in any form, comprising deployed as an independent program or as a module, a component, a subroutine, or other cells suitable for use in a computing environment.

As an example, the computer program may, but does not necessarily, correspond to files in a file system, may be stored in part of a file storing other programs or data, for example, stored in one or more scripts in a Hyper Text Markup Language (HTML) document, stored in a single file dedicated for the discussed program, or stored in a plurality of cooperative files (e.g., the file for storing one or more modules, subprograms or code portions).

As an example, the computer program may be deployed on one computing apparatus for execution, or on a plurality of computing apparatuses at one site for execution, or distributed on a plurality of computing apparatuses interconnected through a communication network at a plurality of sites for execution.

References to "one example" or "an example" throughout this specification mean that particular features, structures, or characteristics related to the example are comprised in at least one example of the present disclosure. Therefore, "in one example" or "in an example" presented everywhere throughout this specification does not necessarily refer to the same example. In addition, these specific features, structures or characteristics may be combined in one or more examples in any proper manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent goodness and badness of the examples.

The above descriptions are merely preferred implementations of the present disclosure, and not intended to limit the scope of the present disclosure. Equivalent structure transformation made within using the contents of the specification and the drawings of the present disclosure under the inventive concept of the present disclosure, or direct/indirect application to other related technical fields are both encompassed within the protection scope of the present disclosure.

What is claimed is:

1. A memory system, comprising:

a memory; and a memory controller coupled with the memory, wherein the memory controller is configured to:

control the memory to store in zones by zones, wherein a memory space of a single one of the zones is configured to support sequential write;

wherein the memory controller is configured with a first interface coupled with a host and to receive a first command from the host through the first interface; the first command comprises an identifier of a specified zone, mode switching information of the specified zone, and a reset write pointer command, wherein the mode switching information occupies a two-bit field in the reset write pointer command, and wherein the memory controller is further configured to switch a memory mode of the specified zone to a target memory mode indicated in the mode switching information according to the mode switching information.

2. The memory system according to claim 1, wherein the memory controller is configured to determine a current memory mode of the specified zone, and switch the current memory mode to the target memory mode according to the mode switching information in a case where the current memory mode is different from the target memory mode indicated in the mode switching information.

3. The memory system of claim 1, wherein:

the memory mode of the specified zone comprises a first memory mode and a second memory mode;

when the zones are in the first memory mode, each of memory cells corresponding to the memory space of the zones is capable to be written with n-bit data;

when the zones are in the second memory mode, each of the memory cells corresponding to the memory space of the zones is capable to be written M-bit data;

M and N are integers greater than or equal to 1; and

M is greater than N.

4. The memory system of claim 3, wherein the memory controller is configured to: determine the specified zone according to the identifier of the specified zone; and switch the specified zone from the first memory mode to the second memory mode according to the mode switching information; or switch the specified zone from the second memory mode to the first memory mode according to the mode switching information.

5. The memory system of claim 3, wherein the memory controller is further configured to: receive a zone write request and write data through the first interface, wherein if the write data is hot data, the zone write request is configured to indicate that the write data is written to a zone in the memory mode being the first memory mode; and if the write data is non-hot data, the zone write request is configured to indicate that the write data is written to a zone in the memory mode being the second memory mode; and write the write data to the memory space of a corresponding zone according to the zone write request.

6. The memory system of claim 1, wherein the memory controller is configured to reset a state of the specified zone to an empty state according to the first command.

7. The memory system of claim 1, wherein the memory controller is configured to reset a state of the specified zone to an empty state according to the first command and simultaneously switch the memory mode.

8. The memory system of claim 1, wherein the zones are zones in a zone name space (ZNS).

9. The memory system of claim 1, wherein the memory controller is configured to: receive a second command through the first interface, wherein the second command comprises mode reply information indicating whether memory mode information needs to be returned; and generate report zone parameter data satisfying the indication of the mode reply information according to the second command.

10. The memory system of claim 9, wherein the memory controller is configured to generate the report zone parameter data comprising the memory mode information according to the second command in a case where the mode reply information is configured to indicate that the memory mode information needs to be returned.

11. The memory system of claim 10, wherein the memory mode information is in a zone descriptor in the report zone parameter data.

12. The memory system of claim 11, wherein the memory mode information occupies a four-bit field in the zone descriptor.

13. The memory system of claim 11, wherein the report zone parameter data comprises a zone descriptor list and a public descriptor; the zone descriptor list comprises at least one zone descriptor indicating an own attribute of a corresponding zone; and the public descriptor is configured to indicate a public attribute of a plurality of the zones.

14. The memory system of claim 11, wherein the zone descriptor further comprises a zone type field, a zone state field, a zone length field, a zone start logical block address field, and a write pointer logical block address field.

15. The memory system of claim 13, wherein the public descriptor comprises a zone list length field, a same field, and a maximum logical block address field.

16. The memory system of claim 9, wherein the second command comprises a report zone command.

17. A method of operating a memory system, the memory system comprising a memory and a memory controller coupled with the memory, and the memory controller being configured with a first interface coupled with a host, the method comprising:

receiving a first command through the first interface, wherein the first command comprises an identifier of a specified zone, mode switching information of the specified zone, and a reset write pointer command, wherein the mode switching information occupies a two-bit field in the reset write pointer command, wherein; zones correspond to memory spaces of the memory, and wherein the memory space of a single one of the zones is configured to support sequential write; and switching, by the memory controller, a memory mode of the specified zone to a target memory mode indicated in the mode switching information according to the mode switching information.

18. The method of claim 17, wherein the switching the memory mode of the specified zone to the target memory mode indicated in the mode switching information according to the mode switching information comprises:

determining a current memory mode of the specified zone, and switching the current memory mode to the target memory mode according to the mode switching information in a case where the current memory mode is different from the target memory mode indicated in the mode switching information.

19. The method of claim 17, wherein:

the memory mode of the specified zone comprises a first memory mode and a second memory mode; when the zones are in the first memory mode, each of memory cells corresponding to the memory spaces of the zones is capable to be written n-bit data; when the zones are in the second memory mode, each of the memory cells corresponding to the memory spaces of the zones is capable to be written M-bit data; M and N are integers greater than or equal to 1; and M is greater than N.

20. A non-transitory computer readable storage medium, storing a computer program thereon, which, when executed, implements an operation method of a memory system, wherein the memory system comprises a memory and a memory controller coupled with the memory, and the memory controller is configured with a first interface coupled with a host; the method comprising:

receiving a first command through the first interface, wherein the first command comprises an identifier of a specified zone, mode switching information of the specified zone, and a reset write pointer command, and wherein the mode switching information occupies a two-bit field in the reset write pointer command, wherein zones correspond to memory spaces of the memory, and wherein the memory space of a single one of the zones is configured to support sequential write; and switching, by the memory controller, a memory mode of the specified zone to a target memory mode indicated in the mode switching information according to the mode switching information.

* * * * *